(12) United States Patent
Smeeton et al.

(10) Patent No.: US 12,140,757 B2
(45) Date of Patent: Nov. 12, 2024

(54) DISPLAY SYSTEM AND METHOD

(71) Applicant: ENVISICS LTD, Milton Keynes (GB)

(72) Inventors: Timothy Smeeton, Milton Keynes (GB); Neil Collings, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 17/977,274

(22) Filed: Oct. 31, 2022

(65) Prior Publication Data
US 2023/0050648 A1    Feb. 16, 2023

Related U.S. Application Data

(63) Continuation of application No. 17/506,329, filed on Oct. 20, 2021.

(30) Foreign Application Priority Data

Oct. 20, 2020  (GB) ..................... 2016616

(51) Int. Cl.
G02B 27/01     (2006.01)
F21V 8/00      (2006.01)
G02B 5/30      (2006.01)
G02B 27/00     (2006.01)
(Continued)

(52) U.S. Cl.
CPC ....... *G02B 27/0103* (2013.01); *G02B 5/3083* (2013.01); *G02B 6/0056* (2013.01);
(Continued)

(58) Field of Classification Search
None
See application file for complete search history.

(56) References Cited

U.S. PATENT DOCUMENTS

2006/0268421 A1    11/2006  Shimizu et al.
2010/0201953 A1*   8/2010   Freeman ............... G02B 27/149
                                                          353/121
(Continued)

FOREIGN PATENT DOCUMENTS

EP    1619536 A1    1/2006
EP    2030072 B1   12/2012
(Continued)

*Primary Examiner* — Derek S. Chapel
(74) *Attorney, Agent, or Firm* — McDonnell Boehnen Hulbert & Berghoff LLP

(57) ABSTRACT

A method and system for reducing the effects of glare in a system comprising a picture generating unit, such as a holographic projector. The system may be a head-up display (HUD), which is configured to display a picture to a viewer, without requiring the user to look away from their usual viewpoint. The HUD system may be comprised within a vehicle. The glare in the system may be caused by light being incident on a surface comprising a screen or a window, through which the user looks at their usual viewpoint. The surface may comprise a windshield in a vehicle. The light that causes the glare may be ambient light. The method and system are provided for reducing the effects of glare in a system that comprises a waveguide in conjunction with the picture generating unit. The waveguide may be operable to act as an exit pupil expander.

11 Claims, 15 Drawing Sheets

(51) Int. Cl.
  *G02B 27/28* (2006.01)
  *G03H 1/02* (2006.01)
  *G03H 1/22* (2006.01)
  *B60K 35/00* (2006.01)
  *B60K 35/23* (2024.01)
  *B60K 35/40* (2024.01)

(52) U.S. Cl.
  CPC ..... *G02B 27/0018* (2013.01); *G02B 27/0081* (2013.01); *G02B 27/0101* (2013.01); *G02B 27/281* (2013.01); *G03H 1/02* (2013.01); *G03H 1/2205* (2013.01); *B60K 35/00* (2013.01); *B60K 35/23* (2024.01); *B60K 35/415* (2024.01); *G02B 2027/0118* (2013.01); *G02B 2027/0123* (2013.01); *G03H 2001/2239* (2013.01); *G03H 2001/2284* (2013.01); *G03H 1/2294* (2013.01); *G03H 2222/12* (2013.01); *G03H 2222/14* (2013.01); *G03H 2222/31* (2013.01); *G03H 2223/16* (2013.01); *G03H 2223/20* (2013.01); *G03H 2223/22* (2013.01); *G03H 2223/24* (2013.01)

(56) References Cited

U.S. PATENT DOCUMENTS

| | | | |
|---|---|---|---|
| 2012/0224062 A1* | 9/2012 | Lacoste | G09G 5/14 348/148 |
| 2015/0153569 A1* | 6/2015 | Yonekubo | G02B 27/145 359/629 |
| 2017/0131546 A1 | 5/2017 | Woltman et al. | |
| 2018/0348515 A1 | 12/2018 | Kuzuhara et al. | |
| 2019/0086674 A1* | 3/2019 | Sinay | G02B 27/283 |
| 2020/0371366 A1* | 11/2020 | Gollier | G02B 27/026 |
| 2020/0371389 A1* | 11/2020 | Geng | G02B 27/0172 |
| 2021/0055549 A1* | 2/2021 | Chang | G02B 27/0103 |
| 2022/0075189 A1 | 3/2022 | Hirata et al. | |
| 2022/0121028 A1* | 4/2022 | Smeeton | G03H 1/02 |

FOREIGN PATENT DOCUMENTS

| | | |
|---|---|---|
| GB | 2498170 A | 7/2013 |
| GB | 2501112 A | 10/2013 |
| WO | 2010/092409 A1 | 8/2010 |

\* cited by examiner

DISPLAY SYSTEM AND METHOD

CROSS-REFERENCE TO RELATED APPLICATIONS

The present application is a continuation of U.S. patent application Ser. No. 17/506,329, filed Oct. 20, 2021, which is a non-provisional patent application claiming priority to United Kingdom Patent Application No. 2016616.1, filed Oct. 20, 2020, the contents of which are hereby incorporated by reference in their entirety.

FIELD OF THE DISCLOSURE

The present disclosure relates to a display system and method. More specifically, the present disclosure relates to a display system having a waveguide and a method of displaying a picture, using such a display system. Some embodiments relate to a holographic display system and a method of displaying a hologram of a picture that is to be viewed via a viewing window. Some embodiments relate to a head-up display (HUD).

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LiDAR", for example.

SUMMARY

Aspects of the present disclosure are defined in the appended independent claims.

In general terms, a method and system are provided for reducing the effects of glare in a system that comprises a picture generating unit or projector, such as a holographic projector. For example, the system may be a head-up display (HUD), which is configured to display a picture to a viewer, without requiring the user to look away from their usual, or required, viewpoint. For example, the HUD system may be comprised within a vehicle. The glare in the system may be caused by light, other than the light of the picture, being incident on a surface comprising a screen or a window, through which the user looks at their usual, or required, viewpoint. For example, the surface may comprise a windshield in a vehicle. The light that causes the glare may be ambient light, such as sunlight, although the term "ambient light" is used herein to describe any light in the environment surrounding the system, wherein that light may be natural or artificial light. In particular, the method and system are provided for reducing the effects of glare in a system that comprises a waveguide in conjunction with (or, as part of) the picture generating unit. The waveguide may be operable to act as a viewing window expander (or, an exit pupil expander) for the picture generating unit.

The method and system may taking advantage of the presence of the waveguide in the system and putting the waveguide to an additional use, for glare reduction, without adversely affecting the functionality of the waveguide as a viewing window expander (or, pupil expander) for light from the picture generating unit. The method and system may comprise harnessing the reflective (or, transmissive-reflective) nature of a pair of surfaces within a waveguide, in conjunction with a circular polarizer that can be arranged to apply a circular polarization to incident ambient light, before it enters the waveguide. The direction of the circular polarization of that ambient light—i.e. whether it is left-handed (i.e. clockwise) or right-handed (i.e. anti-clockwise) circularly polarized—will be reversed, when it experiences an odd number of reflections within the waveguide. Therefore, the circular polarizer can be configured to allow the ambient light into the waveguide but to prevent any of the ambient light that is subsequently transmitted out of the waveguide from being propagated onwards towards a viewer, because its circular polarization will cause it to be blocked by (e.g., absorbed by) the circular polarizer. The circular polarizer may be arranged in cooperation with a transmissive-reflective surface of the waveguide, via which the ambient light both enters and leaves the waveguide. Ensuring that the ambient light enters and leaves the waveguide may ensure that it undergoes an odd number of reflections, and therefore will change its direction of circular polarization when it is within the waveguide.

The method and system may also comprise applying a suitable circular polarization to light from the picture generating unit, and/or to directing light from the picture generating unit so that it can circumvent the circular polarizer (but not the waveguide), so that the circular polarizer will not prevent the light of the picture generating unit from reaching a viewer.

According to an aspect, there is provided a display system having a viewing window, wherein the display system comprises a pair of surfaces arranged to form a waveguide, wherein a first surface of the pair of surfaces is transmissive-reflective and the second surface is reflective. The display system further comprises a circular polarizer arranged in cooperation with the first surface such that ambient light incident upon the first surface is circularly polarized. In other words, the circular polarizer is arranged to apply a circular polarization to incident ambient light, before it enters the waveguide via the first surface. The waveguide is arranged to guide the circularly polarized ambient light by internal reflection between the pair of surfaces and to partially transmit the circularly polarized ambient light via the first surface, towards the circular polarizer. The display system further comprises a picture generating unit arranged to display a hologram of a picture and to inject spatially-modulated light formed from the hologram into the waveguide such that the spatially-modulated light is partially guided along the waveguide by internal reflection between the pair of surfaces and partially transmitted by the first surface at a plurality of locations thereon in order to form a substantially continuous viewing window (via which a viewer may receive the spatially-modulated light).

The waveguide may comprise first and second discrete surfaces or it may comprise a slab with first and second coated surfaces.

The first and second surfaces of the waveguide may each comprise a respective pair of faces. Each pair may be said to comprise an outer face, via which light that is external to the waveguide is incident on the respective surface, and an inner face, via which light that is internal to the waveguide is incident on the respective surface. The circular polarizer may be arranged in cooperation with the outer face of the first surface of the waveguide such that ambient light (i.e., light from the surroundings of the display system, and which is external to the waveguide, such as sunlight and/or moonlight and/or artificial light) travels via the circular polarizer before it is incident upon the outer face of the first surface. In other words, ambient light that was unpolarized or randomly polarized when it reaches the circular polarizer may become circularly polarized by it and therefore that light may exit the circular polarizer and subsequently enter the waveguide, via its first surface, as circularly polarized light. Due to the nature of circularly polarized light, the direction of the polarization (i.e., left-handed or right-handed) will change each time the light is reflected from a reflective (or from a transmissive-reflective) surface, within the waveguide.

The picture may be referred to as being an 'image'. The picture generating unit may be referred to as an 'image generator' or as a 'holographic image projector'. It may be configured to receive the picture, or image (which may be referred to as being a 'target image') and to calculate or to obtain a hologram of it. The hologram may be a computer-generated hologram (CGH). The picture generating unit may comprise a suitable display device for displaying the hologram, such as a pixelated display device, for example a spatial light modulator (SLM), which may be a liquid crystal on Silicon (LCOS) SLM. The display device may also be configured to display one or more other software components such as a software lens or software grating.

The first surface may also be referred to as being 'transflective'. It may be configured to transmit some light and to reflect some light, substantially along an elongate or propagation axis of the waveguide and towards the second surface.

In some arrangements, the spatially-modulated light may be encoded with the hologram. That is, a holographic reconstruction may not yet be formed, from the illuminated hologram, when the spatially modulated is injected (or, launched) into the waveguide. The hologram may be a Fourier or Fresnel hologram. The holographic reconstruction may be formed by the eye(s) of a viewer.

In some arrangements, the spatially-modulated light may be encoded with a holographic reconstruction of the picture, optionally, formed on a light receiving surface. The light receiving surface may be referred to as being a 'display plane'. Suitable optics may be provided for forming a holographic reconstruction of the picture, before the spatially modulated light is injected (or, launched) into the waveguide. For example, a lens that may be a Fourier lens and that may be either a software lens or a hardware lens may be provided.

The light receiving surface may comprise a screen arranged to display the holographic reconstruction of the picture and the display system may further comprise a collimating lens between the screen and waveguide.

The circular polarizer may comprise a linear polarizer and a $\lambda/4$ retarder (or, 'quarter wave plate'), wherein the $\lambda/4$ retarder is disposed between the first surface of the waveguide and the linear polarizer. The circular polarizer may be arranged to either impart left-handed (i.e. clockwise) circular polarization or right-handed (i.e. anti-clockwise) circular polarization upon (non-polarized) light that passes therethrough. The circular polarizer may be provided substantially immediately before (i.e. upstream of) the first surface of the waveguide, along a light path of the ambient light.

The spatially-modulated light that is injected into the waveguide may be circularly polarized, such that it is transmitted by the circular polarizer after partial transmission through the first surface of the waveguide, at each location of the plurality of locations. In order to achieve this, the picture generating unit may comprise or may be provided in conjunction with a second polarizer. For example, the picture generating unit may comprise a light source that outputs substantially linear polarized light for illuminating a hologram displayed by the picture generating unit. The second polarizer may therefore comprise a $\lambda/4$ retarder (or, 'quarter wave plate'), configured to receive the substantially polarized light, after it has been spatially modulated by the picture generating unit, and to apply a retardation, such that it outputs circularly polarized light. The second polarizer may be configured to apply a suitable direction (i.e. 'handedness') of circular polarization to the spatially modulated light such that the spatially modulated light will be transmitted through the circular polarizer once it has been transmitted out of the wave guide.

The spatially-modulated light may be injected into the waveguide through the second surface, and the handedness of the circular polarization of the spatially-modulated light injected into the waveguide may therefore be the same as that of the circular polarizer. The total number of reflections experienced by the spatially-modulated light upon arrival at each location on the first surface of the waveguide may be 2(n−1) where n is a non-zero integer. In some embodiments, an aperture in a partially reflective coating of the second surface is provided in order to receive the spatially-modulated light into the waveguide.

In other words, if the spatially modulated light is injected or launched into the waveguide through the (reflective) second surface, any of the spatially modulated light that is not transmitted when it first reaches the first (transmissive-reflective) surface will be reflected twice within the waveguide (i.e. once by the first surface and once by the second surface), before it reaches the first surface again, and has another opportunity for transmission out of the waveguide towards the circular polarizer. Each time the spatially modulated light is reflected internally by a surface of the waveguide, that reflection will cause a reversal of the direction of its circular polarization. The spatially modulated light will therefore encounter an even number of reflections, within the waveguide, if it is injected through the second surface, before it has an opportunity to be transmitted towards the circular polarizer. Therefore, the direction of the circular polarization of the spatially modulated light that is injected into the waveguide may be the same as that of the circular polarizer, since the spatially modulated light will have that same direction of circular polarization every time it reaches the first surface, as it travels through the waveguide via internal reflections. It will therefore have that same direction of the circular polarization when it is transmitted out of the waveguide, towards the circular polarizer.

In other arrangements, the light may be injected into the waveguide through the first surface and the handedness of the circular polarization of the spatially-modulated light injected into the waveguide may be opposite to that of the circular polarizer. The total number of reflections experienced by the spatially modulated light upon arrival at each location is 2n−1 where n is a non-zero integer. In other words, the spatially modulated light may encounter an odd number of reflections, and therefore an odd number of reversals of its direction of circular polarization, before it may be transmitted out of the waveguide via the first surface. It therefore may initially have an opposite circular polarization to that of the circular polarizer to ensure that it is not blocked by the circular polarizer once it has been transmitted by the waveguide. Thus, dependent on which surface the spatially modulated light from the picture generating unit is to be injected into, the system can be arranged to ensure that said spatially modulated light will, when it is emitted by the waveguide, have the correct polarization status to ensure that it will be transmitted through the circular polarizer and on towards the viewer. Alternatively, in some arrangements, the circular polarizer will be arranged so that it does not lie between a portion of the waveguide from which the spatially modulated light is to be transmitted, and the viewer. In such arrangements, therefore, the circular polarization status of the spatially modulated light will not be determinative on that light reaching the viewer.

The reflectivity of the first surface may be a function of propagation distance such that the luminance of the spatially-modulated light transmitted by the first surface at the plurality of locations is substantially the same. The propagation distance may be defined as a distance that the light travels, along the waveguide, for example in a substantially axial direction.

The reflectivity of the second surface may be greater than 90% such as greater than 95%.

The picture generating unit may further comprise a light source arranged to illuminate the hologram with linearly-polarized light and a λ/4 retarder arranged to convert the polarization of the spatially-modulated light from linear to circular before injection into the waveguide. The light source may comprise a laser light source such as a laser diode.

The circular polarizer may be configured to direct the spatially modulated light towards a viewer or towards any suitable optical component. For example, it may direct the spatially modulated light towards a reflector configured to reflect it towards the viewer. For example, it may direct it towards a combiner that is configured to combine light from the picture with other light that a viewer wants or needs to see. For example, the combiner may comprise a windscreen, or windshield, of a vehicle.

According to an aspect, there is provided a display system having a viewing window, wherein the display system comprises a pair of surfaces arranged to form a waveguide, wherein a first surface of the pair of surfaces is transmissive-reflective and the second surface is reflective. The display system further comprises a circular polarizer arranged in cooperation with the first surface such that ambient light incident upon the first surface is circularly polarized. In other words, the circular polarizer is arranged to apply a circular polarization to incident ambient light, before it enters the waveguide via the first surface. The waveguide is arranged to guide the circularly polarized ambient light by internal reflection between the pair of surfaces and to partially transmit the circularly polarized ambient light via the first surface, towards the circular polarizer. The display system further comprises a picture generating unit arranged to project light of a picture into a waveguide, such that the light of the picture is partially guided along the waveguide by internal reflection between the pair of surfaces and partially transmitted by the first surface at a plurality of locations thereon in order to form a substantially continuous viewing window, via which a viewer may receive the light of the picture.

The light of the picture may comprise light that is spatially modulated by the picture, or light transmitted by the picture, or light that otherwise represents the picture and enables a viewer to see the picture, when the viewer's eye receives the light of the picture. For example, the light of the picture may be light that is encoded with a hologram, wherein the viewer will form a holographic reconstruction of the picture, when the light reaches their eye(s).

According to an aspect, a head-up display (HUD) system is provided having a viewing window, wherein the head-up display system comprises a pair of surfaces arranged to form a waveguide, wherein a first surface of the pair of surfaces is transmissive-reflective and the second surface is reflective, and a circular polarizer arranged in cooperation with the first surface such that ambient light incident upon the first surface is circularly polarized. The HUD system further comprises a picture generating unit arranged to display a hologram of a picture and inject spatially-modulated light formed from the hologram into the waveguide such that the spatially-modulated light is partially guided along the waveguide by internal reflection between the pair of surfaces and partially transmitted by the first surface at a plurality of locations thereon. A combiner is arranged to receive the spatially-modulated light transmitted by the first surface of the waveguide and to redirect it to form a substantially continuous viewing window, via which a viewer may receive the spatially-modulated light. The combiner may or may not be part of the HUD.

According to an aspect, a head-up display (HUD) system is provided having a viewing window, wherein the head-up display system comprises a pair of surfaces arranged to form a waveguide, wherein a first surface of the pair of surfaces is transmissive-reflective and the second surface is reflective, and a circular polarizer arranged in cooperation with the first surface such that ambient light incident upon the first surface is circularly polarized. polarized. In other words, the circular polarizer is arranged to apply a circular polarization to incident ambient light, before it enters the waveguide via the first surface. The waveguide is arranged to guide the circularly polarized ambient light by internal reflection between the pair of surfaces and to partially transmit the circularly polarized ambient light via the first surface, towards the circular polarizer. The HUD system further comprises a picture generating unit arranged to project light of a picture into the waveguide such that the light of the picture is partially guided along the waveguide by internal reflection between the pair of surfaces and partially transmitted by the first surface at a plurality of locations thereon. The HUD further comprises a combiner arranged to receive the light of the picture, which is transmitted by the first surface of the waveguide, and to redirect it to form a substantially continuous viewing window, via which a viewer may receive the light of the picture. Alternatively, the HUD may be arranged to cooperate with the combiner of a different system or device—e.g. the windscreen of a vehicle—to achieve the described effects.

The combiner may comprise a surface such as a screen, window, windshield, or windscreen. It may be arranged so as to be located substantially directly in front of the viewer when the viewer is in situ for using the HUD system. The combiner may be configured to direct the light of the picture towards the viewer in such a way as to enable the viewer to see the picture, via the substantially continuous viewing window, and also to see other light, for example light external to the HUD system, for example light towards infinity when the viewer is looking through the combiner.

According to an aspect, a method of holographic projection is provided comprising receiving a picture for projection, displaying a hologram representing the picture and illuminating the hologram with light from a light source to form spatially modulated light. The method further comprises injecting the spatially modulated light into a waveguide having a pair of surfaces, wherein a first surface of the pair of surfaces is transmissive-reflective and the second surface of the pair of surfaces is reflective, and partially guiding the spatially modulated light along the waveguide by internal reflection between the pair of surfaces and partially transmitting the spatially modulated light out of the waveguide, at a plurality of locations on its first surface, to form a substantially continuous viewing window, via which a viewer may receive the spatially-modulated light. The method may further comprise passing the spatially modulated light of the substantially continuous viewing window through a circular polarizer, wherein the circular polarizer is arranged in cooperation with the first surface, such that ambient light incident upon the first surface is circularly polarized. In other words, wherein the circular polarizer is arranged to apply a circular polarization to incident ambient light, before it enters the waveguide via the first surface, and wherein the waveguide is arranged to guide the circularly polarized ambient light by internal reflection between the pair of surfaces and to partially transmit the circularly polarized ambient light via the first surface, towards the circular polarizer.

The method may comprise, before injecting the spatially modulated light into the waveguide, applying a circular polarization to the spatially-modulated light, such that it will be transmitted by the circular polarizer after its partial transmission through the first surface of the waveguide, at each location of the plurality of locations.

The method may further comprise, after passing the spatially modulated light through the circular polarizer, directing the spatially modulated light to a combiner, wherein said combiner is arranged to redirect the spatially modulated light to form a substantially continuous viewing window, via which a viewer may receive the spatially-modulated light.

According to an aspect, a method of holographic projection is provided comprising receiving a picture for projection and injecting light of the picture into a waveguide having a pair of surfaces, wherein a first surface of the pair of surfaces is transmissive-reflective and the second surface of the pair of surfaces is reflective. The method further comprises partially guiding the light of the picture along the waveguide by internal reflection between the pair of surfaces and partially transmitting the light of the picture out of the waveguide, at a plurality of locations on its first surface, to form a substantially continuous viewing window, via which a viewer may receive the light of the picture. The method may further comprise passing the spatially modulated light of the substantially continuous viewing window through a circular polarizer, wherein the circular polarizer is arranged in cooperation with the first surface, such that ambient light incident upon the first surface is circularly polarized. In other words, wherein the circular polarizer is arranged to apply a circular polarization to incident ambient light, before it enters the waveguide via the first surface, and wherein the waveguide is arranged to guide the circularly polarized ambient light by internal reflection between the pair of surfaces and to partially transmit the circularly polarized ambient light via the first surface, towards the circular polarizer.

The method of any of the aspects may be a computer-implemented method. It may be a partially computer-implemented method.

According to an aspect, a computer program comprising instructions which, when executed by data processing apparatus, causes the data processing apparatus to perform a method according to any of the above aspects.

According to an aspect, a computer readable medium may be provided storing a computer program according to any of the above aspects.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE FIGURES

Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
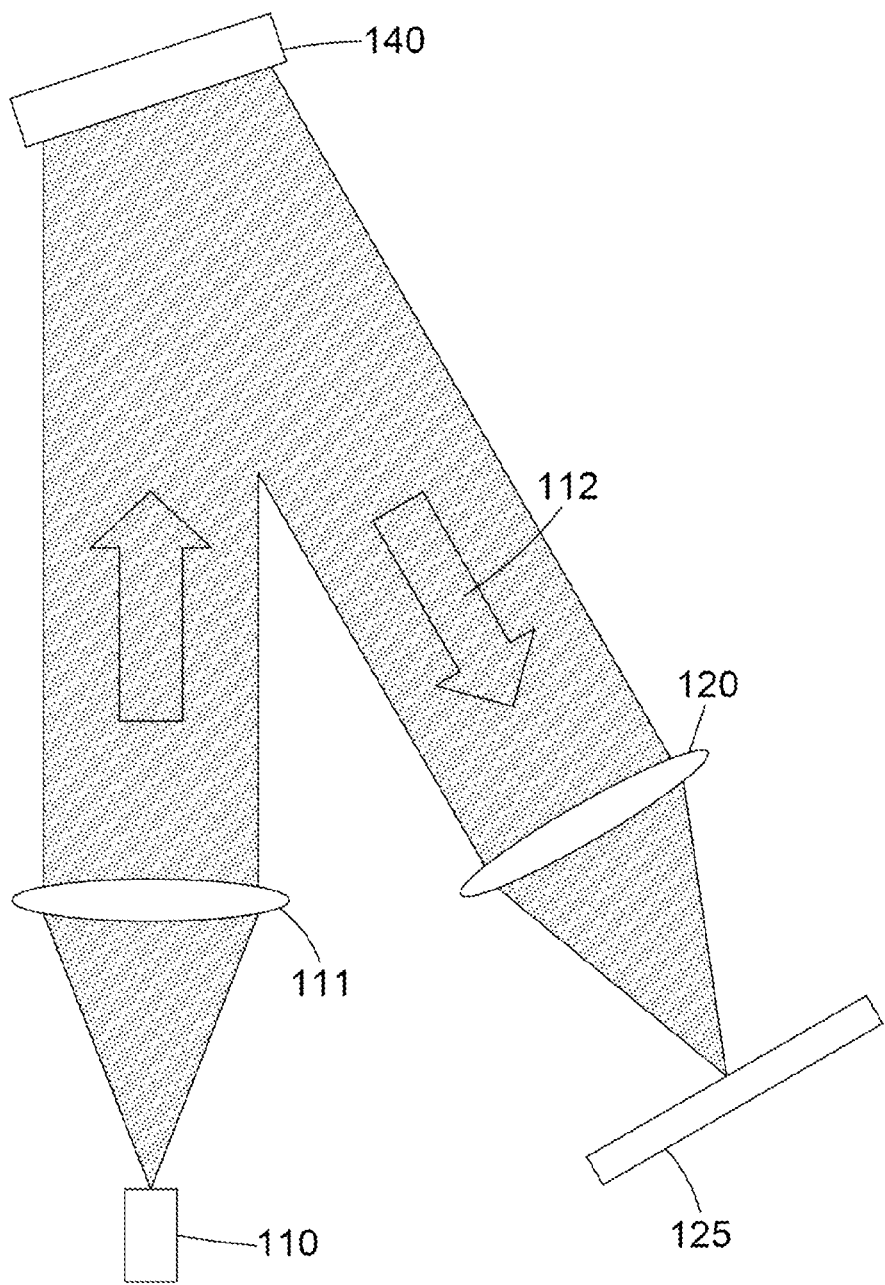
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in United Kingdom Pat. Nos. 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
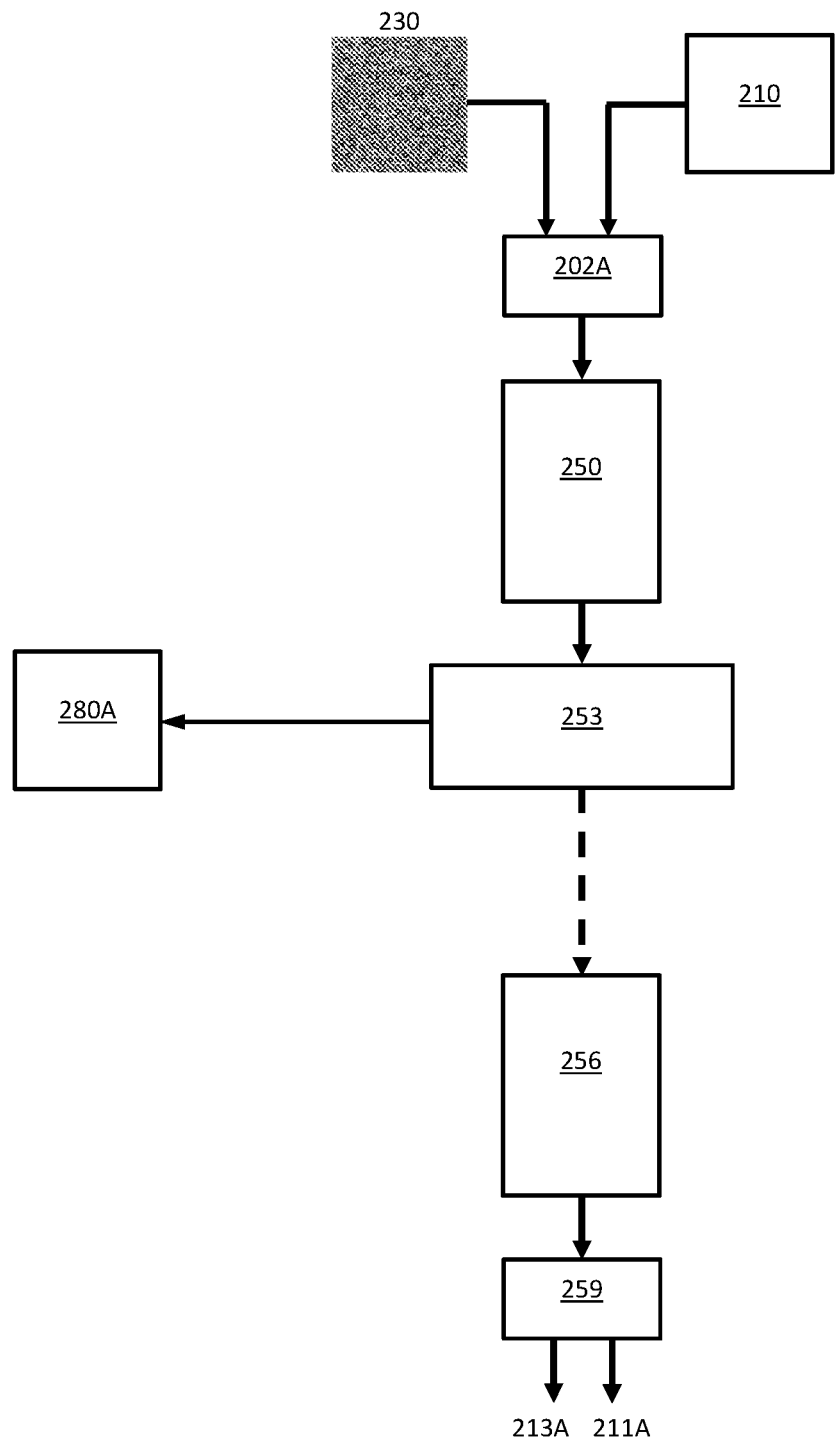
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 210 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
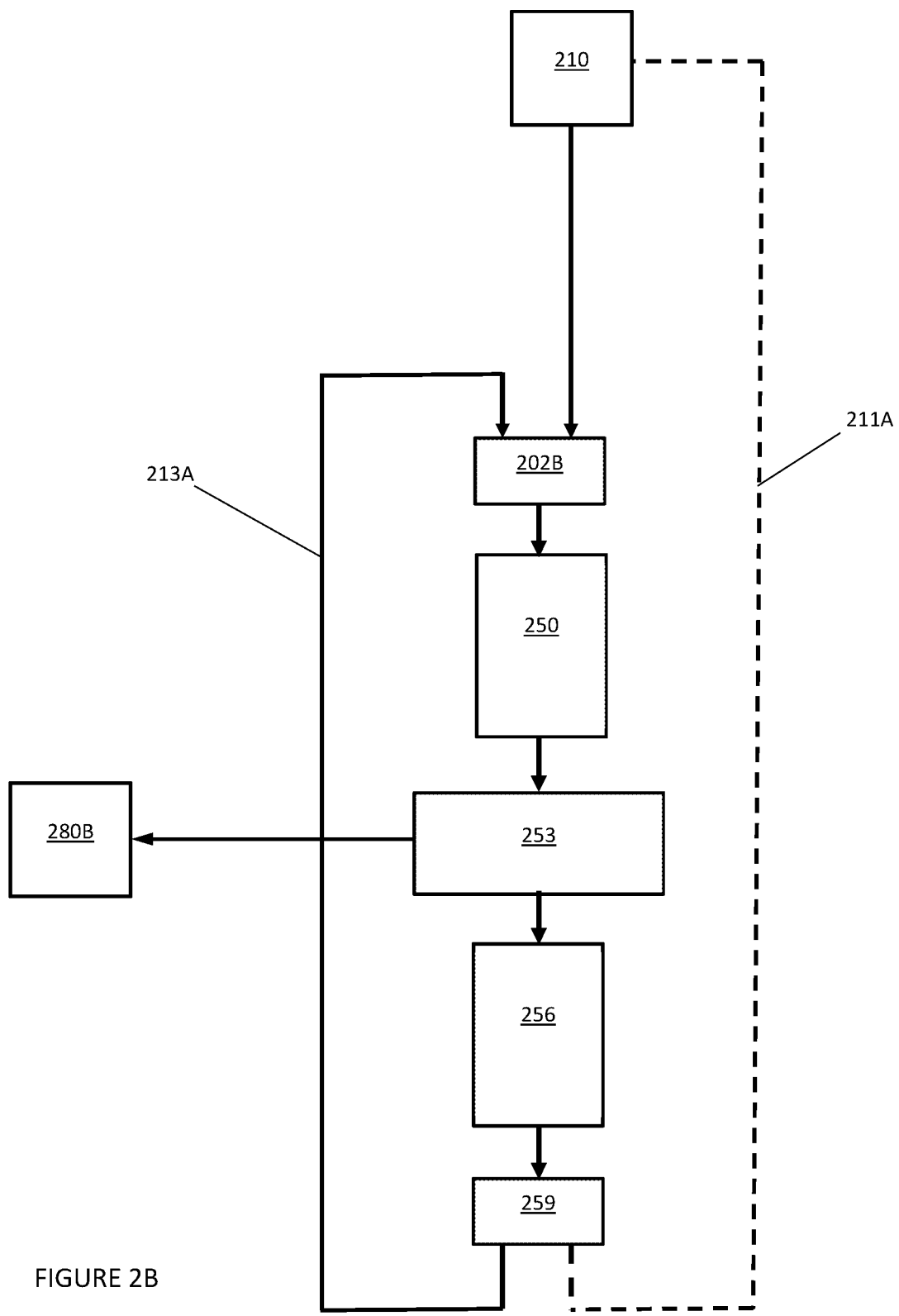
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
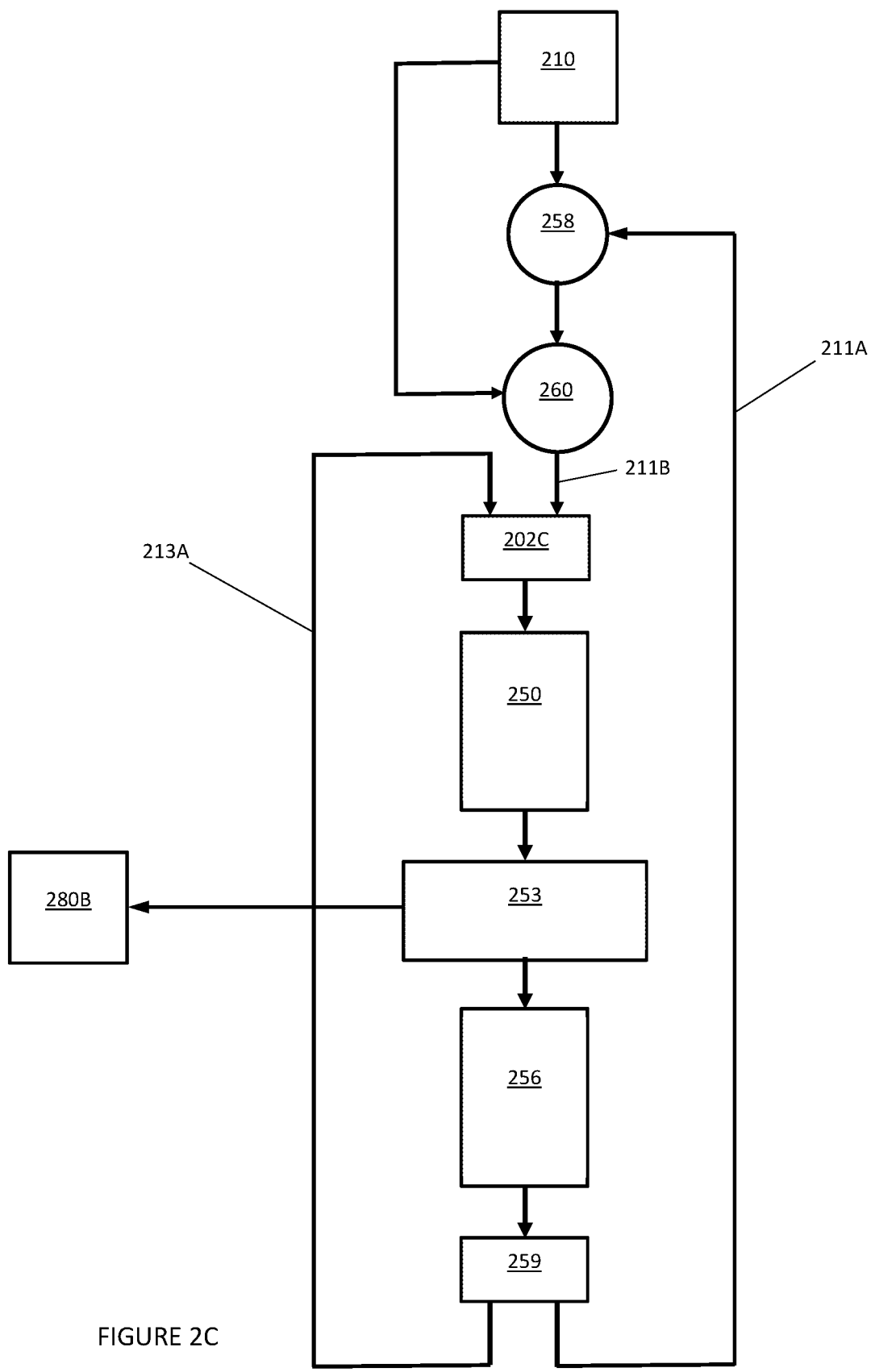
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;

R[x, y] is the complex data set output by the third processing block 256;

T[x, y] is the input or target image;

∠ is the phase component;

Ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
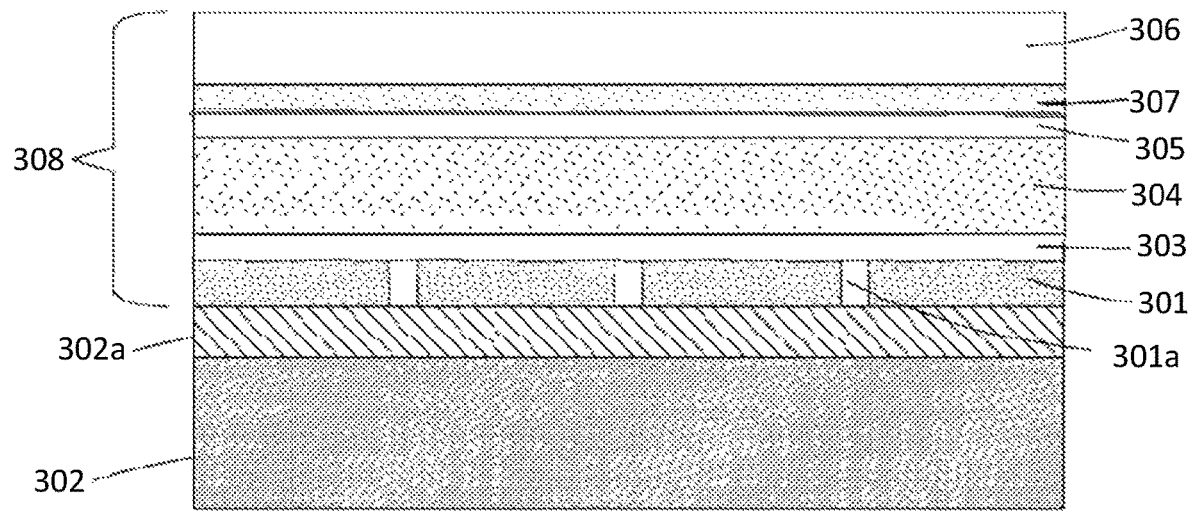
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Display Systems

A display system for displaying a picture (or, an image)—or for displaying a hologram of a picture that is to be viewed, by a viewer—may take many different forms. FIGS. 4 to 8, detailed below, related to holographic display systems, in which an image is represented by a hologram and holographically reconstructed. However, the present disclosure is not limited to holographic display systems, as will be understood from the subsequent discussion of later figures. The present disclosure also relates to other types of display systems such as, for example, digital light processing (DLP) display systems.

The present disclosure relates to display systems that comprise a viewing window (or, an 'eye box region'), via which a viewer receives light that is formed from the image, or from a hologram or from a holographic reconstruction of the image, that is to be viewed by the viewer. For example, the present disclosure relates to display systems such as head-up displays (HUDs).

The term 'eyebox' or 'eye box region' is used herein to refer to a volume of space within which an effectively viewable image is formed by a display system. In simple terms, it comprises a region within which a viewer's eye can be located, in order for the viewer to be able to see the image that is formed by a display system. The eye box may be defined at a particular viewing distance or range of viewing distances. It is also known as the 'eye motion box (EMB)', or, more generally, 'viewing window'.

Waveguide Pupil/Viewing Window Expander

In holographic projection systems such as head-up displays (HUDs) it is typically desirable to expand the volume of space corresponding to the EMB, or viewing window. In particular, the viewer needs to be able to move his or her head around and so able to see the complete image from any position within a limited region around the eye box and/or at a particular viewing distance.

Thus, a pupil expander (which may instead be referred to as a 'viewing window expander') may be employed to enlarge the EMB or viewing window. Typically, the pupil expander enlarges the EMB by generating extra rays by division of the amplitude of the incident wavefront. In some embodiments, the pupil expander enlarges the EMB and increases the field of view for a given eye position.

Figure 4:
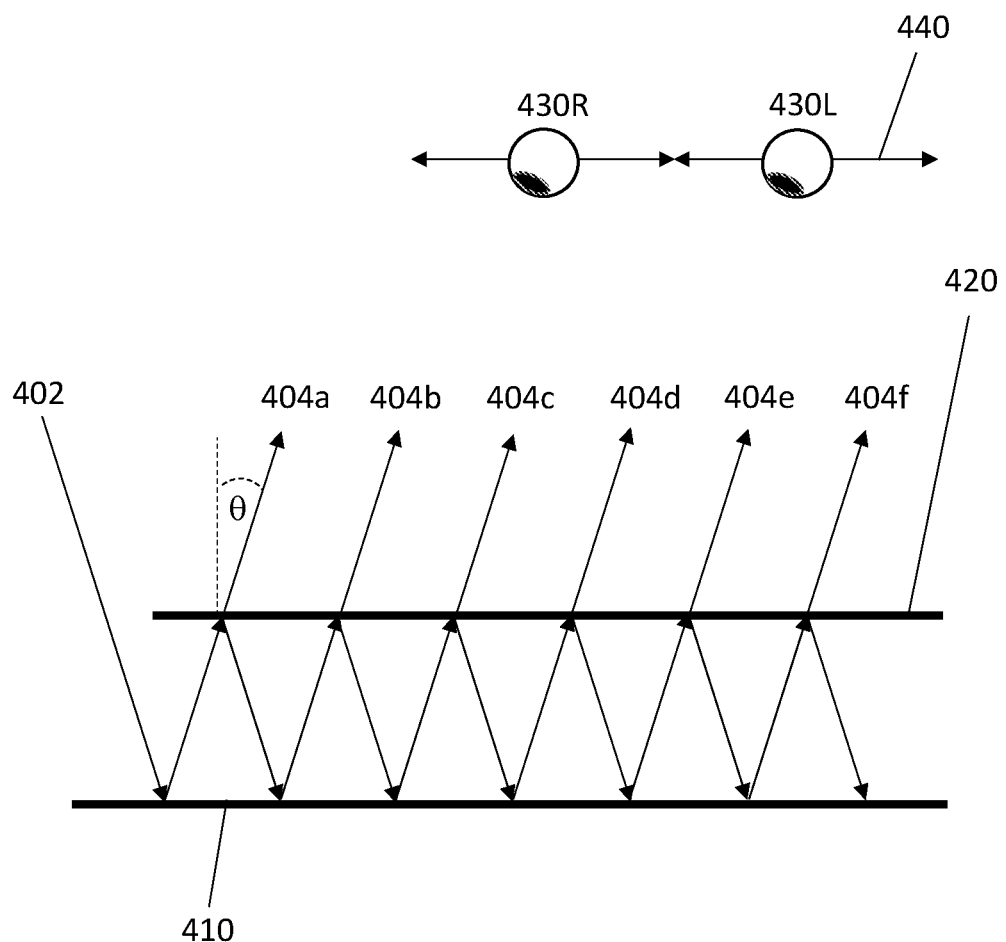
FIG. 4 shows an example pupil expander comprising a waveguide.

FIG. 4 illustrates an example pupil expander comprising a waveguide. In this example, the waveguide comprises two reflective surfaces but the description that follows is equally applicable to a slab configuration in which light is guided inside by the slab by internal reflections between the top and bottom surface of the slab. The general principle of a waveguide is known in the art and not described in detail herein. A waveguide guides light within a layer between a pair of parallel reflective surfaces by internal reflection. A pupil expander is formed from a waveguide comprising a first graded/partially reflective surface 420 (e.g. a graded mirror having varying reflectivity with distance) and a second fully reflective surface 410 (e.g. a mirror having substantially 100% reflectivity). In particular, first reflective surface 420 comprises a reflective coating, the reflectivity of which decreases along the length of the slab. The layer may be glass or Perspex. The waveguide may therefore be a glass or Perspex block or slab. The first reflective surface may be a first surface of the glass block and the second reflective surface may be a second surface of the glass block, wherein the first surface is opposite and parallel to the second surface. Alternatively, the layer may be air and the first and second reflective surface may be separate components—e.g. a first and second mirrors spatially-separated to form an air gap within which light propagates by internal reflection.

Accordingly, as shown in FIG. 4, an input light beam 402 (which may comprise spatially modulated light encoded with a picture (i.e. light of a picture/image or, simply a picture) or spatially modulated light encoded with a hologram as described below) comprising input light rays enters the waveguide through an input port thereof. The waveguide is arranged to guide light received at the input port to a viewing window. In the illustrated arrangement, the input port comprises a gap in the first partially reflective surface 420 near one end of the waveguide, but other positions for the input port are possible. The viewing window is an area or volume within which a viewer may view an image as described herein. The angle of incidence of the input light beam 402 is such that the light rays propagate along the length of the waveguide due to internal reflection by first partially reflective surface 420 and second fully reflective surface 410. Example rays are illustrated in FIG. 4. Due to the graded reflectivity of first reflective surface 420, a proportion of light is transmitted by first reflective surface 420 to provide a plurality of output light rays 404a-f (herein called "replicas" because they replicate the input light rays) along the length of the waveguide. Thus, first reflective surface 420 forms a viewing surface. It is said that the pupil (or viewing window) is expanded by the replicas formed by the waveguide. In particular, by forming a plurality of replicas 404a-f along the length of the waveguide, the viewing window is increased in size. Each replica 404a-f corresponds to a proportion of the amplitude (intensity or brightness) of the input light beam 402. It is desirable that the grading provides a decrease in reflectivity (or conversely an increase in transmissivity) of the first reflective surface 420 along the length of the waveguide such that each replica 404a-f has substantially the same amplitude. Thus, a viewer having a right viewer eye 430R and left viewer eye 430L at the eye box at a viewing distance from the first reflective surface 420 is able to see the image at any position within an expanded viewing window, as illustrated by arrows 440.

For simplicity, the description provided herein ignores absorption by the reflective surfaces. This absorption may be substantially zero and/or constant. The skilled person will understand that reflectivity, transmissivity and absorptivity must all be defined in order to fully describe the behaviour of the reflective surfaces at each of the plurality of locations that receive spatially-modulated light. However, in order to understand this disclosure, absorption can be ignored.

The waveguide shown in FIG. 4 expands the viewing window in one dimension—corresponding to the lengthwise direction along which the light beam propagates within the waveguide—as shown by arrows 440. As the skilled person will appreciate, it is possible to expand the viewing window in two dimensions, when required, by using two orthogonal waveguides.

The first reflective surface 420 of the waveguide may be coated with a coating comprising a large number of thin films (e.g. 25 or more thin films) in order to provide the necessary graded reflectivity. In particular, as described above, such thin films or similar coatings need to provide decreasing reflectivity, and thus increasing transmissivity, with propagation distance such that the brightness (ray intensity) of each replica 404a-f is substantially constant. The amplitude of the propagating light beam reduces with propagation distance due to output of the replicas 404a-f and due to any other optical losses such as imperfect reflections from the second reflective surface 410. Thus, the grading of the first reflective surface 420 is designed to take into account the drop in intensity of the propagating light beam with propagation distance, whilst ensuring that each replica 404a-f has substantially the same intensity so that the image seen has uniform brightness throughout the viewing window (i.e. at all viewing positions).

Figure 5:
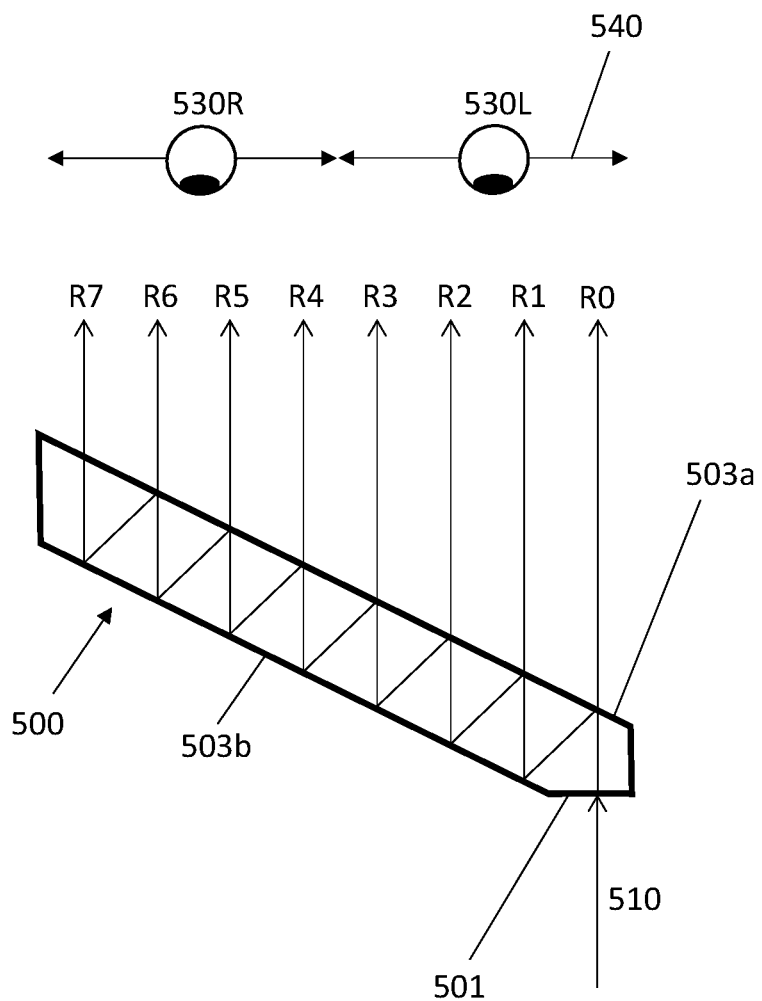
FIG. 5 shows an example a slab waveguide.

FIG. 5 shows a slab waveguide 500 comprising an input port 501 arranged to receive input light 510 such as light of a picture or light of a hologram. The slab is made from a material having a refractive index greater than air. Light received into the slab 500 is guided by a series of internal reflections between a bottom surface 503b and an opposing top surface 503a. The bottom surface 503b may be a substantially perfect reflector—such as a mirror—and the top surface 503a may be mostly-reflective. The top surface 503a may allow some transmission of light. Accordingly, light generally propagates along the slab by internal reflection but a series of replicas, R0 to R7, of the light rays are formed owing to the partial transmissivity of the top surface 503a. The division of light (or replica of the light rays) shown in FIG. 5 functions to expand the exit pupil of the waveguide. Pupil expansion achieved by the light ray replicas allows a viewer, having a right eye 530R and left eye 530L, to move (as shown by arrows 540) within a viewing window area (or volume) whilst still receiving light of the picture—i.e. whilst still be able to see the picture, or hologram. As described with reference to FIG. 4, the reflectivity of the top surface decreases with distance from the input port so that the intensity of each replica, Ro to R7, is substantially the same. The so-called graded-reflectivity of the top surface 503a may be provided by a multilayer, dielectric coating. In practice, it is difficult to fabricate an adequate dielectric coating for high quality display—particularly, full colour display.

The present disclosure provides an improved waveguide. The improved waveguide may comprise two mirrors or may be based on a slab, with its top and bottom faces comprising suitably reflective coatings. For the avoidance of doubt, FIGS. 6, 7B and 8, which illustrate example system configurations in accordance with this disclosure, show a waveguide formed by two mirrors—rather than a slab with reflective coatings—by way of example only. The effects of light refraction are not fully illustrated in FIG. 5 to preserve simplicity but they will be well-understood by the person skilled in the art.

First Example System

Figure 6:
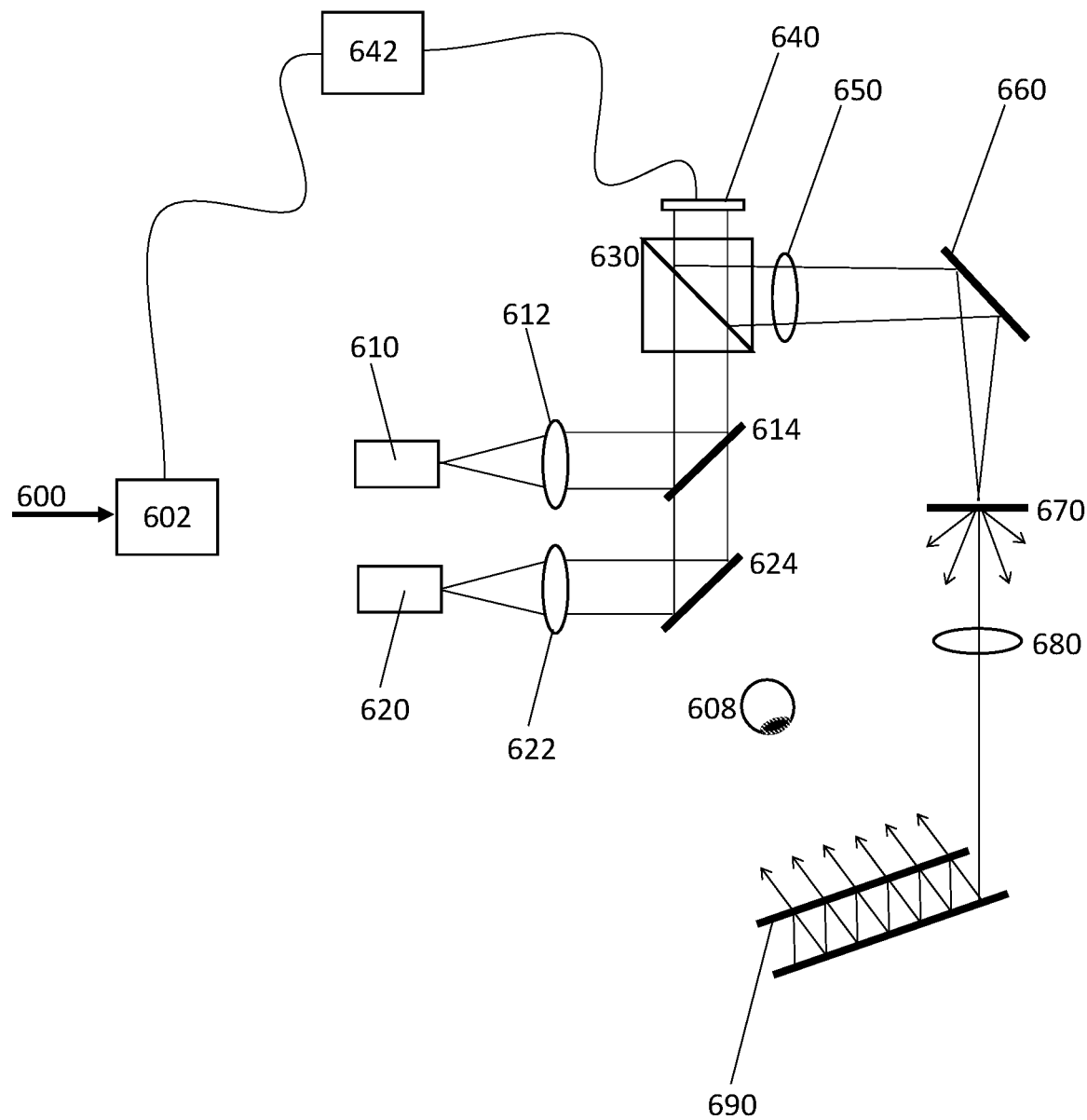
FIG. 6 shows a first example holographic display system comprising a waveguide forming a waveguide pupil expander.

FIG. 6 shows a holographic display system comprising a waveguide forming a waveguide pupil expander in accordance with a first example system configuration. FIGS. 6 to 8 refer to colour projection systems by way of example only and the present disclosure is equally applicable to a monochromatic system.

The holographic display system comprises a picture generating unit arranged to form a first picture (also called "first image") and a second picture (also called "second image"). A first single colour channel (also called "first display channel") is arranged to form the first picture and comprises a first light source 610, a first collimating lens 612 and a first dichroic mirror 614. First dichroic mirror 614 is arranged to reflect light of a first wavelength along a common optical path so as to illuminate a spatial light modulator (SLM) 640. The first wavelength of light corresponds to the first display channel of a first colour (e.g. red). A second single colour channel (also called "second display channel") is arranged to form the second picture and comprises a second light source 620, a second collimating lens 622 and a second mirror 624. Second mirror 624 is arranged to reflect light of a second wavelength along the common optical path so as to illuminate the SLM 640. The second wavelength of light corresponds to the second single colour channel of a second colour (e.g. green). As described below, in other arrangements, the picture generating unit may comprise a third single colour/display channel (equivalent to the first and second channels) arranged to form a third picture, wherein the third colour channel corresponds to a wavelength of light of a third colour (e.g. blue). In the illustrated arrangement, SLM 640 comprises a single array of light modulating pixels (e.g. LCOS) that is illuminated by light of both the first and second wavelengths. In other arrangements, SLM 640 may comprise separate arrays of light modulating pixels that are illuminated by light of the respective first and second wavelengths.

The holographic display system further comprises a holographic controller 602 arranged to control the picture generating unit, specifically to control the light output by the picture generating unit as described herein. First spatially modulated light of the first colour corresponding to the first picture is output by SLM 640 to form a first single colour image (e.g. red image) on a light receiving surface 670, such as a screen or diffuser. A first single colour computer-generated hologram is calculated by a holographic controller 602 and encoded on SLM 640, for example by a display driver 642. The SLM 640 displays the first hologram and is illuminated by light of the first colour from the first colour/display channel to form a first holographic reconstruction on the light receiving surface 670 which is positioned at the replay plane. Similarly, second spatially modulated light of the second colour corresponding to the second picture is output by SLM 640 to form a second single colour image (e.g. green image) on the light receiving surface 670. A second single colour computer-generated hologram is encoded on SLM 640 by holographic controller 602. The SLM 640 displays the second hologram and is illuminated by light of the second colour from the second colour/display channel to form a second holographic reconstruction on the light receiving surface at the replay plane. In the illustrated arrangement, a beam splitter cube 630 is arranged to separate input light to SLM 640 and spatially modulated light output by SLM 640. A Fourier lens 650 and mirror 660 are provided in the optical path of the output spatially modulated light to light receiving surface 670. It may be said that a first/second picture is formed on the light receiving surface 670. The first/second pictures are first/second holographic reconstructions of the respective first/second holograms. Thus, a composite colour picture may be formed on light receiving surface 670 combining the first and second pictures. A projection lens 680 is arranged to project the first and second pictures formed on the light receiving surface 672 to an input port of a pupil expander in the form of a waveguide 690. A viewer 608 may view a magnified image of the pictures from the expanded eye box—the "viewing window"—formed by waveguide 690 owing to optical power of projection lens 680. Waveguide 690 comprises an optically transparent medium separated by first and second reflective surfaces as described above with reference to FIG. 4. Thus, the holographic display system of FIG. 6 has an "indirect view" configuration—that is the viewer does not directly view, or receive light of, the hologram and does not directly view the holographic reconstruction itself. Instead, the holographic reconstruction is formed on the light receiving surface 670 and the viewer views an image of the holographic reconstruction. Holographic controller 602 may receive other external and internal inputs 600 for use in generating the computer-generated holograms as known in the art. Such inputs may determine the image content for display by the holographic display device.

The holographic display system illustrated in FIG. 6 has a picture generating unit comprising a first colour (e.g. red) display channel arranged to display a first single colour hologram and a second colour (e.g. green) display channel arranged to display a second single colour hologram, by way of example only. In example implementations, three or more display channels may be provided configured to display respective single colour holograms. For example, a full-colour composite image/picture may be formed by displaying respective red, green and blue single colour holograms. The present disclosure may be implemented using a picture generating unit comprising any number of single colour channels including just one colour channel.

In examples shown—such as FIGS. 6 and 8—a frame sequential colour scheme (described below) may be used with one SLM 640. However, the present disclosure is equally applicable to a spatially-separated colour scheme (also described below) in which a different SLM is used for each single colour channel.

Waveguide Geometry

Figure 7A:
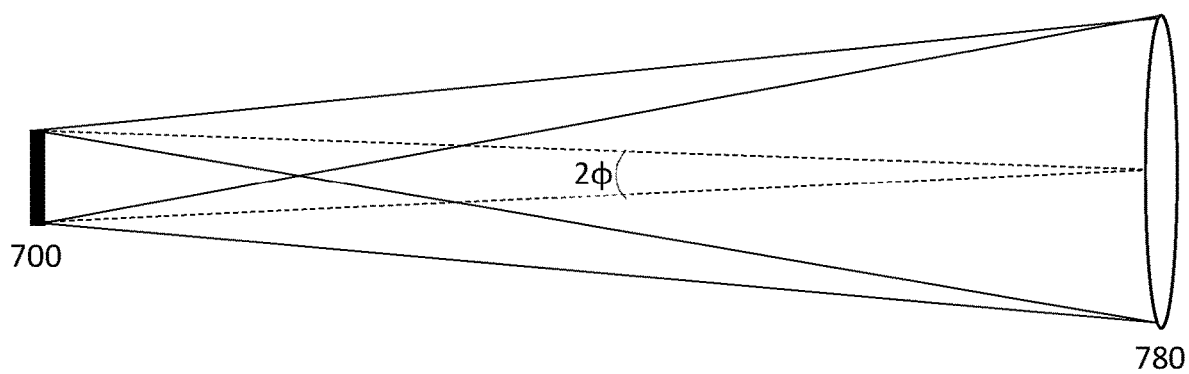
FIGS. 7A to 7C show the geometry of the waveguide pupil expander of FIG. 6.
Figure 7B:
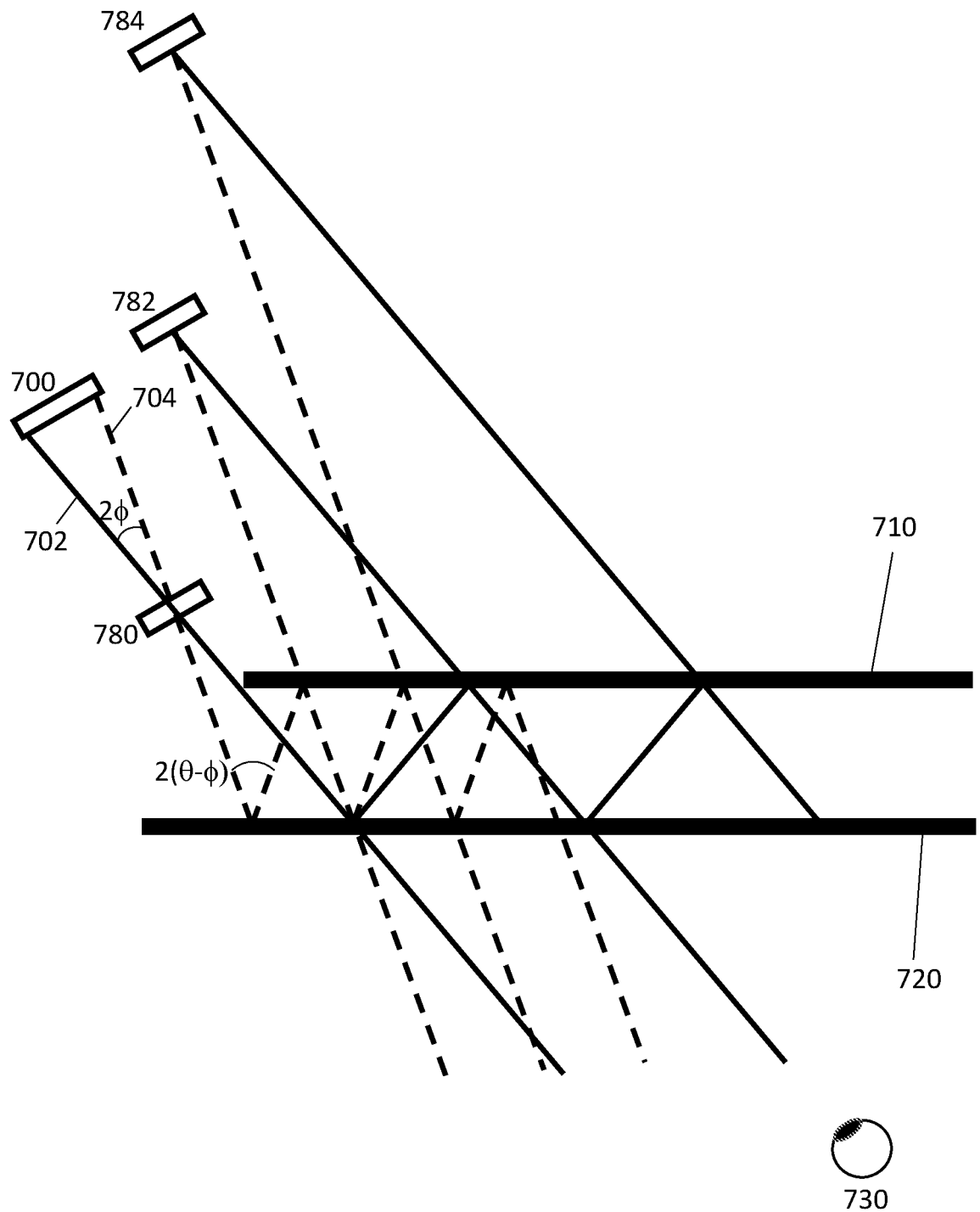
Figure 7C:
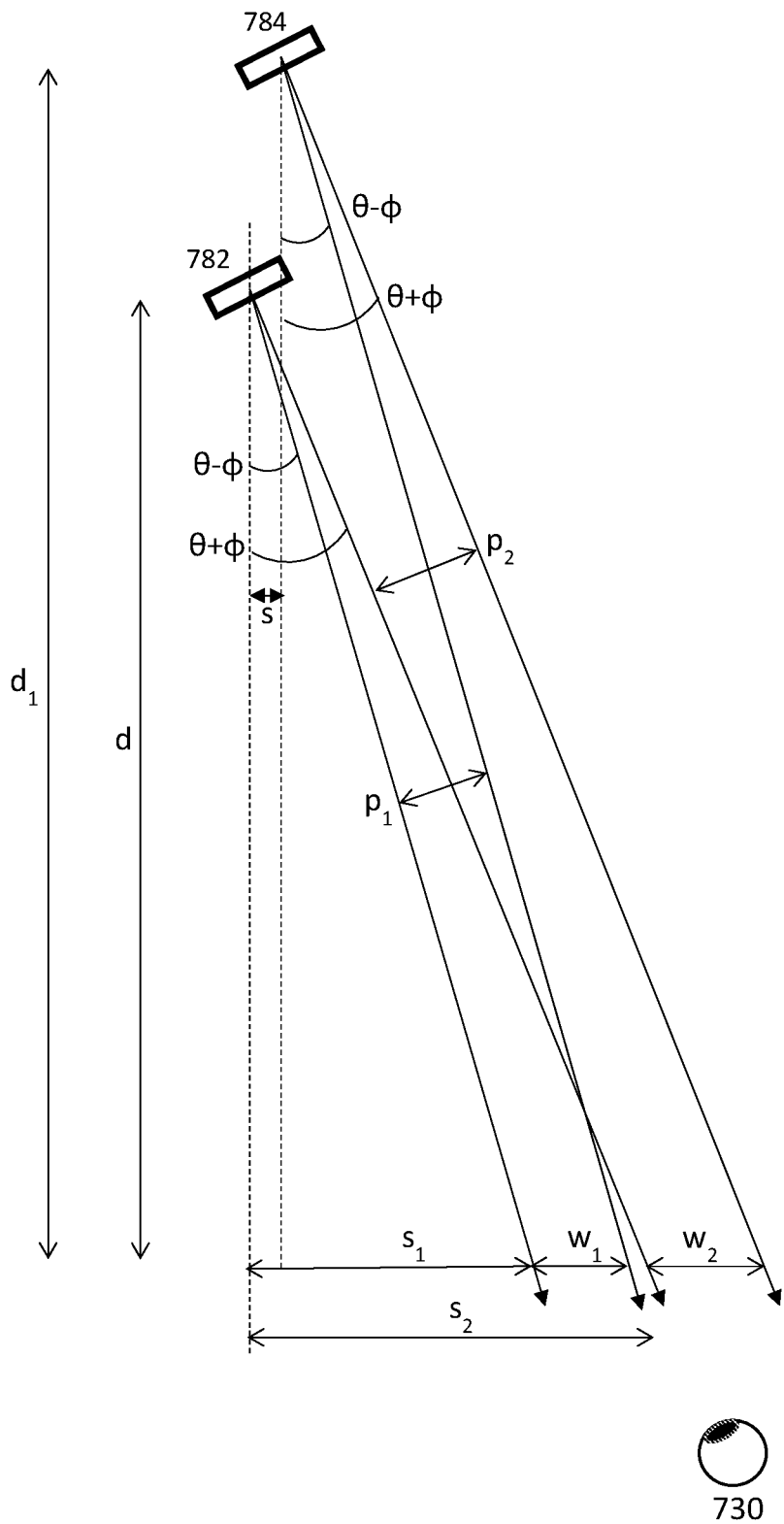
Figure 8:
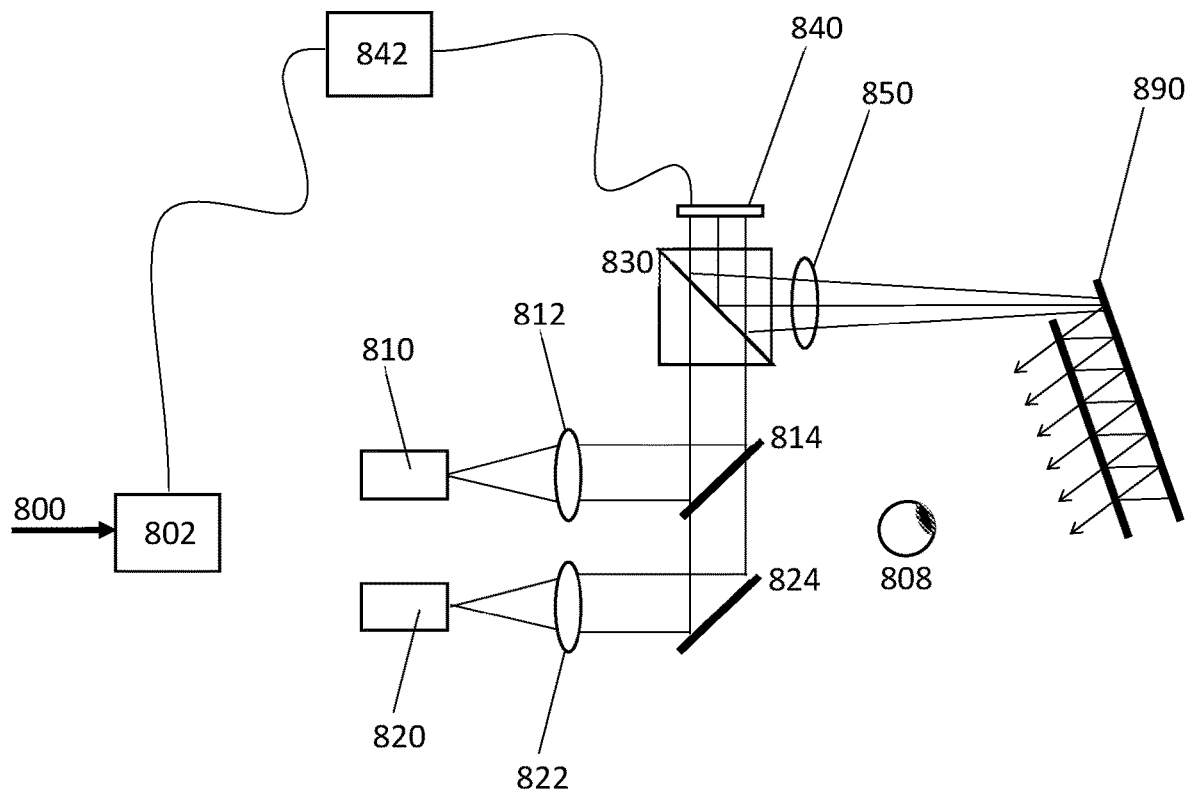
FIG. 8 shows a second example holographic display system comprising a waveguide forming a waveguide pupil expander.

FIGS. 7A-C show the geometry of the waveguide pupil expander in accordance with embodiments. In particular, FIGS. 7B and 7C show the positioning, and propagation along waveguide, of the chief rays 702 and 704 of an input image beam (received from SLM 700 via projection lens 780 as a described above) and the output of replicas 782, 784 visible to viewer 730. Waveguide comprises first partially reflective surface 720 and second fully reflective surface 710 as described above.

The geometry shown in FIG. 7C may be represented by the following equations.

$$w_1 = 2d \tan(\theta - \varphi)$$

$$w_2 = 2d \tan(\theta + \varphi)$$

$$p_1 = 2d \sin(\theta - \varphi)$$

$$p_2 = 2d \sin(\theta + \varphi)$$

$$\tan(\theta - \varphi) = s_1/d = (s_1 + w_1 - s)/d_1$$

$$\tan(\theta - \varphi) = s_2/d = (s_2 + w_2 - s)/d_1$$

$$s_1 d_1 = (s_1 + w_1 - s)d$$

$$s_1 \Delta d = 2d^2 \tan(\theta - \varphi) - sd \quad (1)$$

$$s_2 d_1 = (s_2 + w_2 - s)d$$

$$s_2 \Delta d = 2d^2 \tan(\theta + \varphi) - sd \quad (2)$$

Subtract (1) from (2)

$$\Delta d = 2d^2(\tan(\theta + \varphi) - \tan(\theta - \varphi))/(s_2 - s_1)$$

Subtract $s_1(2)$ from $s_2(1)$ $$0 = 2s_2 d^2 \tan(\theta - \varphi) - ss_2 d - 2s_1 d^2 \tan(\theta + \varphi) - ss_1 d$$

$$s = (2s_2 d \tan(\theta - \varphi) - 2s_1 d \tan(\omega + \varphi))/(s_1 + s_2)$$

$$= (s_2 w_1 - s_1 w_2)/(s_1 + s_2)$$

Second Example System

FIG. 8 shows a holographic display system comprising waveguide pupil expander in accordance with a second example system configuration.

The holographic display system illustrated in FIG. 8 is similar to the holographic display system of FIG. 6 but characterised by the absence of a screen between the spatial light modulator and the viewing plane. In particular, the holographic display device in FIG. 8 comprises a picture generating unit arranged to form a first picture (or first image) and a second picture (or second image). A first single colour/display channel (e.g. red colour channel) comprises a first light source 810, a first collimating lens 812 and a first dichroic mirror 814 arranged to illuminate SLM 840 with light of the first wavelength. A second single colour/display channel (e.g. green colour channel), comprises a second light source 820, a second collimating lens 822 and a second mirror 824 arranged to illuminate the SLM 840 with light of the second wavelength. The first display channel is arranged to form the first image (e.g. red image) at a holographic replay plane. A first single colour computer-generated hologram is encoded on SLM 840 by a holographic controller 802, for example by display driver 842. The SLM 840 displays the first hologram and is illuminated by light from the first colour channel to form a first holographic reconstruction at the holographic replay plane. Similarly, the second display channel is arranged to form the second image (e.g. green image) at the holographic replay plane. A second single colour computer-generated hologram is encoded on SLM 840 by holographic controller 802. The SLM 840 displays the second hologram and is illuminated by light from the second colour channel to form a second holographic reconstruction at the holographic replay plane.

The holographic display device further comprises a beam splitter cube 830, arranged to separate input light to and output light from SLM 840. However, in contrast FIG. 6, the holographic display device is a direct view system. This means that there is no light receiving surface, on which to form one or more holographic reconstructions, located between the SLM 840 and the viewer 808 in FIG. 8. The holographic reconstruction(s) will therefore either be formed at an intermediate plane in free space or formed on the retina of the viewer's eye. In the illustrated arrangement of FIG. 8, the first of these options is shown, wherein a lens 850 is positioned in the optical path of the spatially modulated light output by SLM 840. The lens 850 is optional. When the lens 850 is present, between the SLM 840 and the waveguide 890, the lens 850 behaves in a similar manner to the Fourier lens 650, described above in relation to FIG. 6. That is; the lens 850 is operable to form a holographic reconstruction of the illuminated hologram at an intermediate plane in free space, between the lens 850 and the waveguide 890. The light that is incident on, and is transmitted by, the waveguide 890 therefore is light of the holographic reconstruction. In these embodiments, it may be said that the viewer receives spatially modulated light encoded with the holographic reconstruction. This may also be expressed as the viewer receiving light 'of the picture' or light 'encoded with the picture'.

In some arrangements, there is no lens located between the SLM 840 and the viewer 808, and so the viewer 808 may directly-view the spatially modulated light from the spatial light modulator. Therefore, the light that is incident on, and is transmitted by, the waveguide 890 in such arrangements is light of the hologram. In such arrangements, the viewer's eye 808 receives the light of the hologram and the lens of the viewer's eye 808 forms a holographic reconstruction on the retina of the eye. In these embodiments, it may be said that the viewer receives spatially modulated light encoded with the hologram.

Regardless of whether or not a lens 850 is present in the arrangement of FIG. 8, the waveguide 890 comprises an optically transparent medium separated by first and second reflective surfaces as described above. Thus, the holographic display device of FIG. 8 has an "direct view" configuration—that is the viewer effectively looks directly at the display device (i.e. spatial light modulator), since there is no screen or other light receiving surface between the viewer and the display device. It will therefore be understood that the light receiving surface of FIG. 6 is optional. Holographic controller 802 may receive other external and internal inputs 800 for use in generating the computer-generated holograms as known in the art. Such inputs may determine the image content for display by the holographic display device.

In other embodiments, lens 850 is a weak lens which has insufficient optical power to form a holographic reconstruction upstream of the viewer 808 (that is, before the light reaches the viewer 808) but contributes, with the optical power provided by the eyes of the viewer 808, to the hologram-image transform.

Glare Reduction

It is known for a waveguide to be comprised within a head-up display (HUD) system, for example within a vehicle. Such a waveguide may act as a pupil expander (or, a viewing window expander) within a picture display system, which might be a holographic picture display system. Typically, in a HUD system comprised, for example, within a vehicle, the light emitted by a waveguide therein either travels towards the viewer's eyes directly and/or (more usually) is directed towards a reflector such as a car windscreen (or, windshield) and from there is directed towards the viewer's eyes. Such a reflector may be referred to as being a 'combiner' since it is configured to combine the light from the picture with other light that the viewer needs or wants to see. For example, it may combine light from the horizon, viewed by the viewer through a windshield of a vehicle, with light from the picture that is generated by a picture generating unit within the HUD. This may be done in a manner that enables the user to maintain his or her direction of view (i.e., to keep looking out the windshield, whilst also seeing the light from the picture generating unit).

The reflection of sunlight into a viewer's eyes is an important consideration for HUD systems, for which the viewer is often a driver of a vehicle. This reflection may be referred to as 'glare'. As is well known, glare may dazzle the viewer and may at least temporarily affect their vision. It may also cause the viewer to react, on instinct, by turning their face away from the source of the light.

Figure 9:
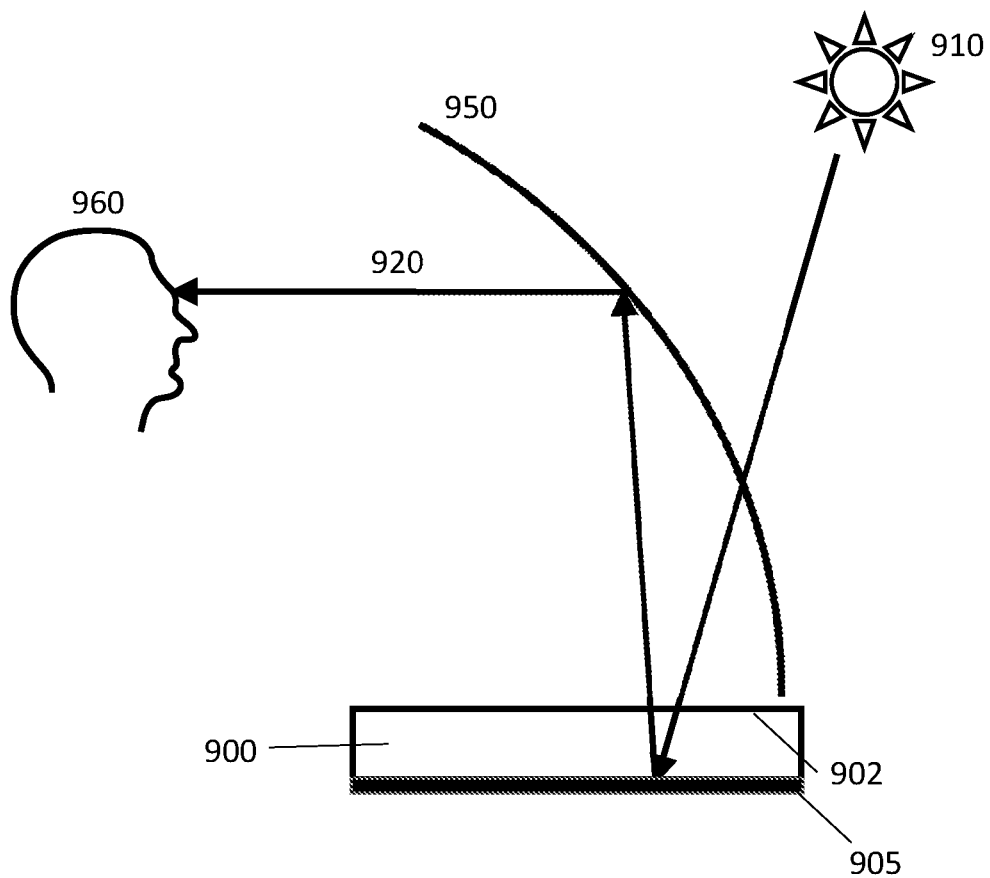
FIG. 9 shows a conventional head-up display (HUD) system.

FIG. 9 herein illustrates a known HUD system, in which the viewer 960 may encounter glare. The system comprises a waveguide 900, from which light is emitted towards a windscreen 950 and reflected on towards a viewer 960 as shown by arrow 920. The waveguide 900 comprises an upper surface 902, which may be reflective-transmissive to light of the picture. The waveguide 900 further comprises a lower surface 905 which is highly reflective as will be understood from the foregoing description of FIGS. 4 to 8 herein. The waveguide 900 maybe comprised within a picture display system such as the holographic picture display systems of FIGS. 6 and 8. Alternatively, it may be comprised within another (non-holographic) type of picture display system.

Conventionally, when light such as sunlight 910 enters the waveguide 900 through the upper surface 902, it will be reflected by the highly reflective lower surface 905 and at least some of it will subsequently be transmitted, by the upper surface 902, back towards the viewer 960 and/or towards the windscreen 950 that reflects light towards the viewer 960. Therefore, the system poses significant risk of glare and of the associated potentially dangerous side effects of glare.

Figure 10:
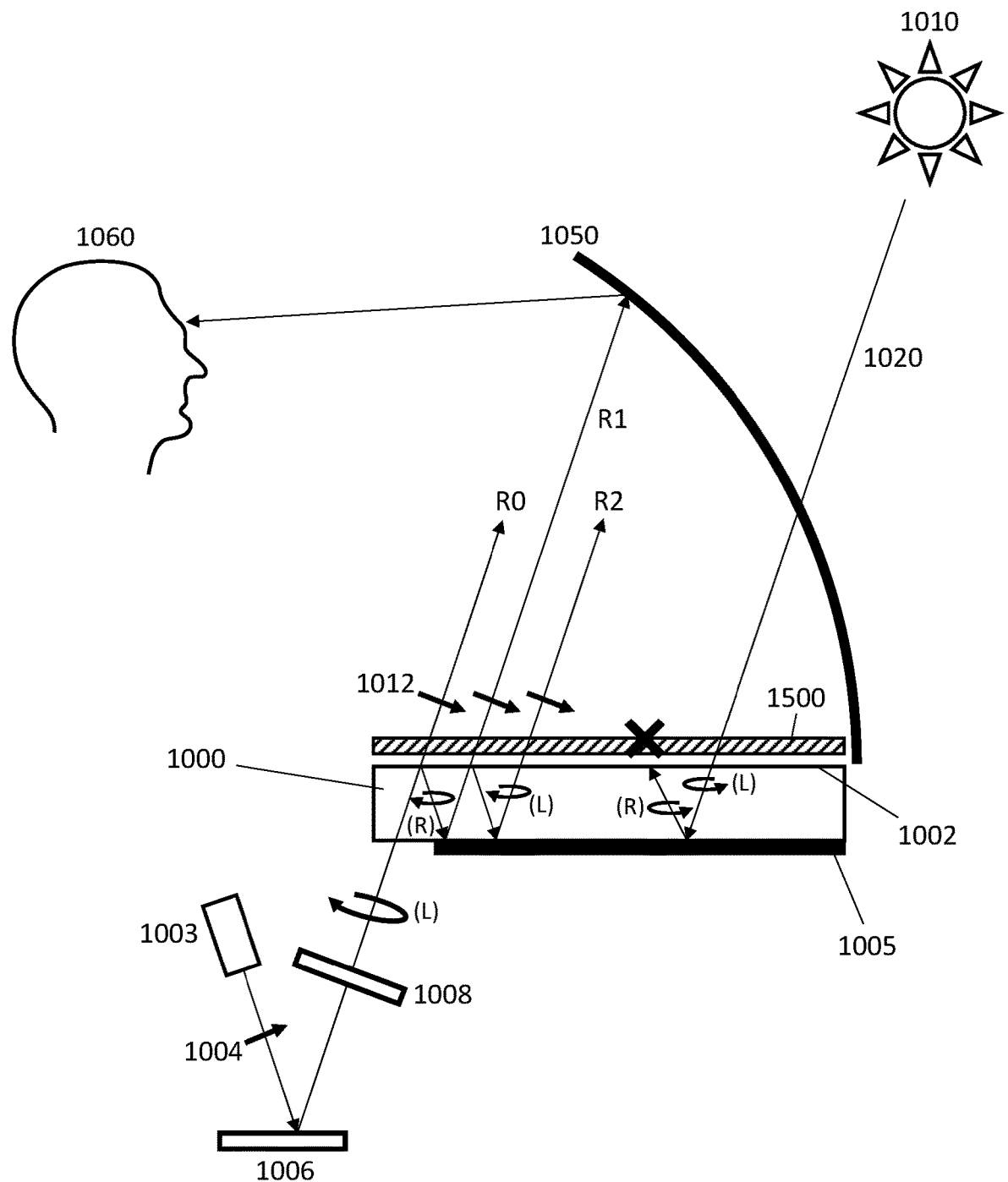
FIG. 10 shows an improved head-up display (HUD) system in accordance with embodiments.

An improved display system is shown in FIG. 10. The system in FIG. 10 comprises a HUD system but the present disclosure is not limited to HUD systems. Similarly, FIG. 10 comprises a holographic picture generating unit, but the present disclosure is not limited to holographic systems. Instead, the improvements disclosed herein with respect to glare reduction, and with respect to preventing or reducing unwanted transmission of light from a waveguide towards a user, may be implemented for any suitable display system.

The display system of FIG. 10 is similar to that of FIG. 9, in that it comprises a waveguide 1000, from which some light can be emitted towards a windscreen 1050 or other optical combiner and/or directly towards a viewer 1060. The waveguide 1000 comprises an upper surface 1002, which may be reflective-transmissive. The waveguide 1000 further comprises a lower surface 1005, which is highly reflective. In addition, the system of FIG. 10 comprises a circular polarizer 1500 located close to the upper surface 1002. The circular polarizer 1500 is provided to work in conjunction with the waveguide 1000, which is already comprised within the system for the purpose of pupil expansion of the light from the picture generating unit. The addition of the circular polarizer 1500 enables the waveguide 1000 to also contribute to glare reduction for the system.

The circular polarizer 1500 is located between the windscreen 1050 and the upper surface 1002 of the waveguide 1000 such that light, for example incident light 1020 (e.g., from sun 1010), travelling through the windscreen 1050 will be incident on the circular polarizer 1500 before reaching the upper surface 1002 of the waveguide 1000. Therefore, the incident light 1020 will reach the upper surface 1002 as circularly polarized light. Moreover, after being reflected by the lower surface 1005 of the waveguide 1000 and transmitted back out of the upper surface 1002, that incident light 1020 would have to travel via the circular polarizer 1500 before it could reach the viewer. However, the circular polarizer 1500 blocks it, as detailed further below.

The upper surface 1002 of the waveguide 1000 may comprise, for example, a graded mirror that has varying reflectivity with distance. The lower surface 1005 of the waveguide 1000 may comprise, for example, a mirror having substantially 100% reflectivity. The lower surface may have at least 90% reflectivity or at least 95% reflectivity.

If the upper surface 1002 comprises a graded mirror, it may be arranged to have decreasing reflectivity, and thus increasing transmissivity, in a preferred direction. In the arrangement of FIG. 10, it may be preferred for the reflectivity of the upper surface 1002 to decrease (and, thus, for its transmissivity to increase) in an axial direction along the waveguide 1000, substantially from left to right in the non-limiting example shown in FIG. 10. This decreasing reflectivity, with axial distance, is to better accommodate the transmission of light from a picture display system, which is shown in FIG. 10 and is discussed further below. Typically, most of the surface area of the graded mirror will have relatively low transmissivity (<10%).

The circular polarizer 1500 may be formed from any suitable material. In FIG. 10, the circular polarizer 1500 is shown as being substantially planar however this should be regarded as being illustrative only and not limiting. The circular polarizer 1500 may have any suitable size and shape. The circular polarizer 1500 may be disposed at any suitable location between the windscreen 1050 and the waveguide 1000. For example, a lower surface of the circular polarizer 1500 may abut an upper surface of the waveguide 1000 or there may be a gap, which may be a relatively small gap, between an upper surface of the waveguide 1000 and a lower surface of the circular polarizer 1500.

In general, a circular polarizer has a first surface and a second surface opposite to the first surface. When unpolarized light is incident on the first surface, it propagates through the circular polarizer and emerges from the second surface, having a circular polarization. The handedness of the circular polarizer describes the handedness of the circularly polarized light in this configuration. For example, if the propagated light, which emerges from the second surface, has "left-handed" circular polarization then the circular polarizer is referred to as a "left-handed" circular polarizer. When light with left-handed circular polarization is incident on the second surface of a left-handed circular polarizer, the light is substantially transmitted through the left-handed circular polarizer and emerges from its first surface as substantially linearly polarized light. When light with right-handed circular polarization is incident on the second surface of a left-handed circular polarizer, the light is substantially blocked (i.e. not substantially transmitted through the left-handed circular polarizer; it may be substantially reflected and/or substantially absorbed).

Figure 11:
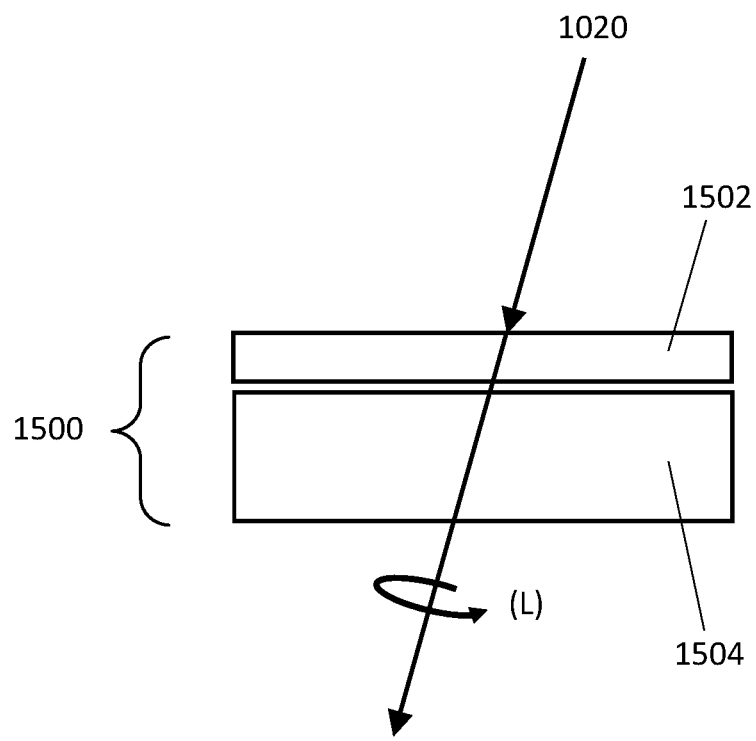
FIG. 11 shows a magnified view of the circular polarizer of FIG. 10.

The circular polarizer may comprise any suitable components, which enable it to behave as a circular polarizer, as detailed below. For example, as shown in FIG. 11, the circular polarizer 1500 may comprise a linear polarizer 1502 and a λ/4 light retarder (also known as a 'quarter-wave plate') 1504. In this case, referring to the first surface and second surface of the circular polarizer described above, the first surface of the circular polarizer is the upper surface of the linear polarizer 1502 in FIG. 11 (i.e. the surface not proximate to the λ/4 light retarder 1504) and the second surface of the circular polarizer is the lower surface of the λ/4 light retarder 1504 in FIG. 11 (i.e. the surface not proximate to the linear polarizer 1502). The λ/4 light retarder 1504 may be configured such that principal axes (e.g. optic axes) of the retarder are at an angle of 450 to the direction of linear polarization (direction of electric field oscillation) of light propagated through the linear polarizer 1502. The linear polarizer 1502 may comprise an absorbing linear polarizer that has low reflectivity. Circular polarizers, linear polarizers and wave plates are well known so their basic operation is not described in detail herein. However, the function and effect of the circular polarizer 1500 in the system of FIG. 10 will be further understood from the description below.

The circular polarizer 1500 is configured to apply a polarization to incident light, which may (before reaching the circular polarizer 1500) be unpolarized light, such as sunlight. In the example shown in FIG. 10, the circular polarizer 1500 therein applies a 'left-handed' circular polarization to the incident light 1020. This may instead be referred to as a 'anti-clockwise' circular polarization. It will be appreciated that the present disclosure is not limited to the circular polarizer 1500 applying a left-handed circular polarization. It could instead apply a 'right-handed' (or, a 'clockwise') circular polarization and the other polarizations described below could be similarly reversed, for a right-handed circular polarizer, in order to provide the same effect as is described below in relation to the particular example shown.

Referring again to FIG. 10; the incident light 1020 is polarized, to a left-handed circular polarization, by the circular polarizer 1500 and propagates on towards the waveguide 1000. As described above in relation to earlier figures, light can enter the waveguide 1000 and propagate towards its highly reflective lower surface 1005. When the polarized light hits the lower surface 1005, it is reflected back towards the upper surface 1002. The 'handedness' (i.e. the direction of rotation of polarization relative to the propagation direction of the light) of the circular polarization is also reversed on reflection by the lower surface 1005. Therefore, light which was left-handed circularly polarized when incident on the lower surface 1005 will be right-handed circularly polarized when it is reflected therefrom. The newly right-handed circularly polarized light travels back towards the upper surface 1002 and, as described in relation to earlier figures, some of it will be transmitted through that upper surface 1002 whilst some other of it will be reflected back along the waveguide 1000, as discussed below. The upper surface 1002 preferably has low birefringence, so that it will not affect the circular polarization of any incident light 1020 that propagates out through the upper surface 1002. Therefore, the light that is transmitted through the upper surface 1002, out of the waveguide 1000, will remain right-handed circularly polarized.

Unlike the arrangements in the earlier figures, in the system of FIG. 10 the circular polarizer 1500 is present and is configured not to permit transmission of right-handed circularly polarized light therethrough when such right-handed circularly polarized light is incident on the circular polarizer 1500 from the waveguide. That is, right-handed circularly polarized light received from the waveguide-side of the circular polarizer 1500 (upwardly in FIG. 10) is blocked from further transmission. Therefore, any light such as sunlight, which in previous arrangements may have travelled from the waveguide towards the viewer 1060, either directly and/or via the windscreen 1050, is instead absorbed by the circular polarizer. In other words, the circular polarizer 1500 blocks the incident light 1020 that leaves the waveguide 1000 from reaching the viewer 1060.

As a result, any potential glare from the incident light 1020 is eliminated or is at least significantly attenuated, from the viewer's perspective.

If a portion of the right-handed circularly polarized sunlight is reflected (when the remainder of it is transmitted) by the upper surface 1002 of the waveguide 1000, said reflection by the upper surface 1002 will also change the handedness of the circular polarization of that portion of the sunlight. Therefore, it will propagate back towards the lower surface 1005 as left-handed circularly polarized light, where it will be reflected and have its circular polarization reversed again, to become right-handed circularly polarized light. When it reaches the upper surface 1002 for a second time, some of that right-handed circularly polarized light will be transmitted by the upper surface 1002 of the waveguide 1000, but then blocked by the circular polarizer 1500, and some other of it will be reflected back towards the lower surface 1005, with its polarization reversed. This cycle may repeat several times, as the incident light 1020 (or, what remains of the incident light 1020) propagates through the waveguide 1000, in an axial direction that is substantially right to left in the example shown in FIG. 10.

Regardless of the number of reflection cycles that occur, within the waveguide 1000, because the incident light 1020 enters and leaves the waveguide 1000 via the same surface (in this example, the upper surface 1002), it will always encounter an odd number of reflections within the waveguide. Therefore, the incident light 1020 will always hit the upper surface 1002 of (and, ultimately, leave) the waveguide 1000 with a different direction of circular polarization to that with which it entered the waveguide 1000. In this example, therefore the incident light 1020 will always hit the upper surface 1002 of the waveguide 1000 as right-handed circularly polarized light. Therefore, the portion of that light which is transmitted by the upper surface 1002 will always be blocked from further transmission, towards the viewer 1060, by the circular polarizer 1500. Moreover, as mentioned above, the upper surface 1002 in the arrangement of FIG. 10 may have a graded reflectivity, wherein its reflectivity reduces (and its transmissivity increases) substantially from left to right. As a result, when the incident light 1020 (which enters the waveguide 1000 substantially from the upper right-hand side in FIG. 10) travels along the waveguide 1000, substantially from right to left, it encounters increased reflectivity and reduced transmissivity, with every cycle of reflections that occurs.

Importantly, the circular polarizer 1500 also blocks ambient light that is directly reflected by the upper surface 1002 towards the windscreen 1050/viewer 1060. That is, the circular polarizer also blocks ambient light that does not even enter the waveguide. This potential source of glare is therefore additionally reduced. This is important because the reflectivity of the upper surface 1002 of the waveguide 1000 is generally high, especially towards the input port side (left-hand side in FIG. 10).

In addition to providing glare reduction from sunlight as detailed above, the waveguide 1000 in FIG. 10 is configured to act as a pupil expander (or, a viewing window expander) for a picture display system. Any suitable picture display system may be used but in FIG. 10 it comprises a holographic picture generating unit (PGU).

The holographic PGU in FIG. 10 comprises a light source 1003 that is configured to direct light towards a pixelated display device such as a spatial light modulator (SLM) 1006. The SLM 1006 may comprise an LCOS pixelated display device. In the example of FIG. 10, it is a reflective SLM but the present disclosure also relates to display systems with transmissive SLM's. The light source 1003 may comprise a laser light source. The light may be coherent light that is suitable for irradiating a hologram that is displayed on the SLM 1006. For example, the hologram may comprise a computer-generated hologram (CGH).

In FIG. 10 there is a light retarder 1008, which in this example comprises λ/4 retarder (also known as a quarter-wave plate) disposed in between the SLM 1006 and the waveguide 1000. In operation, the light source is arranged to direct light, which in FIG. 10 is linearly polarized in the direction indicated by arrow 1004, towards the SLM 1006 to irradiate a hologram displayed thereon. The light is reflected as spatially modulated light, which is still linearly polarized and is now also spatially modulated in accordance with (i.e., modulated by) the displayed hologram.

The spatially modulated light propagates towards the waveguide 1000 and, in doing so, passes through the λ/4 retarder 1008. The effect of doing so is that the spatially modulated light changes from being linearly polarized to being circularly polarized. The retarder may be configured such that principal axes (e.g. optic axes) of the retarder are at an angle of 450 to the direction of linear polarization (direction of electric field oscillation) of the spatially modulated light. In the example shown in FIG. 10, the spatially modulated light becomes left-handed circularly polarized. The left-handed circularly polarized light propagates onwards towards the waveguide 1000, which acts as a pupil expander as described above in relation to the previous figures, in order to guide the light from the SLM 1006 to an expanded viewing window for the viewer 1060. The left-handed circularly polarized, spatially modulated, light enters the waveguide 1000 via an input port. In the illustrated arrangement, the input port comprises a gap in the highly reflective lower surface 1005 near one end of the waveguide (shown on the left hand side of the waveguide 1000 in FIG. 10), but other positions for the input port are possible.

Because the spatially modulated light is (at least partially) left-handed circularly polarized when it enters the waveguide 1000, at its lower surface, when the spatially modulated light reaches the upper surface 1002 of the waveguide 1000, the portion of it that is transmitted by that upper surface 1002 will be further transmitted by the circular polarizer 1500. Moreover, upon passing through the circular polarizer 1500, the spatially modulated light will revert back to being substantially linearly polarized. Therefore, the polarization of the spatially modulated light—denoted by arrow R0 in FIG. 10—when it reaches the windscreen 1050 and the viewer 1060 will be at least substantially the same as the polarization of that light when it was emitted by the SLM 1006, before it reached the λ/4 retarder 1008.

As with the other waveguide pupil expanders described above, the waveguide 1000 in FIG. 10 is arranged to reflect a portion of the spatially modulated light that reaches its upper surface 1002 after initial entry into the waveguide 1000. The reflection will reverse the circular polarization of that portion of the spatially modulated light to right-handed. But the waveguide 1000 is arranged such that it will be reflected towards the highly reflective lower surface 1005, which will reflect the portion of spatially modulated light and reverse its circular polarization back to left-handed. When that left-handed circularly polarized spatially modulated light once again reaches the upper surface 1002, part of it will be transmitted through both the upper surface 1002 and the circular polarizer 1500. This is denoted by arrow R1 in FIG. 10. A respective other part of the spatially modulated light will be reflected for a second time back towards the lower surface 1005, for the cycle to repeat itself. The next portion of spatially modulated light that is transmitted through the upper surface 1002 and the circular polarizer 1500 is denoted by arrow R2 in FIG. 10. Each time a portion of the spatially modulated light passes through the circular polarizer 1500, its polarization reverts back to being substantially linear, as shown by the arrows denoted 1012 in FIG. 10.

As mentioned above, the upper surface 1002 of the waveguide 1000 can have graded reflectivity. It may therefore be arranged such that substantially all of the remaining spatially modulated light is transmitted by the upper surface 1002, after it has been reflected by both the upper surface 1002 and the lower surface 1005 twice. Therefore, the arrow denoted R2 in FIG. 10 may comprise substantially all of the remaining spatially modulated light that was not transmitted at R0 or R1. However, this is only one possible embodiment and other waveguide configurations may be provided in order to reflect the spatially modulated light more times than is shown in FIG. 10. Advantageously, the circular polarizer 1500 does not attenuate the spatially modulated light, or does so only very slightly. Therefore, the optical efficiency of the system remains high, even though the glare is significantly reduced due to the presence of the circular polarizer 1500.

There is no lens shown between the SLM 1006 and the waveguide 1000 in FIG. 10. Therefore, the light that travels to the viewer 1060, from the SLM 1006, is spatially modulated by the hologram itself, not by a holographic reconstruction. The viewer's eye lens therefore effectively acts as a Fourier Transform (FT) lens, to form a holographic reconstruction on the user's retina from the spatially modulated light that is encoded with/by the hologram.

In other embodiments, at least one lens is provided between the SLM 1006 and the waveguide 1000 but the viewer's eye still ultimate forms the holographic reconstruction. For example, a 4f optical system may be included between the SLM 1006 and the waveguide 1000. The 4f optical system may de-magnify or relay the light pattern formed on the plane of the SLM 1006.

According to an alternative arrangement, the system of FIG. 10 may form a holographic reconstruction before the spatially modulated light reaches the waveguide 1000. To do so, the system should include a lens, such as a Fourier lens. This may comprise a physical lens (similar to the Fourier lens 650 shown in FIG. 6) or a software lens, which may be encoded on the SLM 1006 in conjunction with a hologram. Such an arrangement may comprise a light receiving surface, such as a screen or a diffuser, located at a holographic replay plane, on which the holographic reconstruction may be formed. Alternatively, the holographic reconstruction may be formed on an intermediate plane in free space. The arrangement may further comprise a collimating lens, for collimating the spatially modulated light, now encoded with (i.e., modulated by) the holographic reconstruction, and guiding it towards the waveguide 1000. In such an arrangement, the spatially modulated light would also propagate via the λ/4 retarder 1008, to give the light a polarization state that would enable it to pass through the circular polarizer 1500 (i.e., left-handed circularly polarized in the example of FIG. 10).

If a light receiving surface such as a diffuser or screen was included in the arrangement of FIG. 10, some loss of optical power or luminance of the light that reaches the viewer 1060 would be expected, due to the possibility of a small but significant depolarization effect in the light receiving surface. Inside the waveguide 1000, some light would be transmitted by the upper surface 1002, as detailed above, and any reflected light would encounter one or more cycles of two reflections, within the waveguide 1000, wherein each cycle returns the original state of circular polarization that the light had, when it first entered the waveguide 1000.

The system of FIG. 10 can be implemented without a λ/4 retarder 1008 between the SLM 1006 and the waveguide 1000, both in arrangements in which the light is spatially modulated by a hologram and in those in which the light is spatially modulated by a holographic reconstruction. Without the λ/4 retarder 1008, a 50% attenuation of all the light transmitted from the waveguide 1000 may be expected, by the circular polarizer 1500.

As mentioned above, after spatially modulated light has been transmitted by both the upper surface 1002 of the waveguide 1000 and by the circular polarizer 1500, and is propagating on towards the viewer 1060 and/or to the windscreen 1050, the light will be (at least substantially) linearly polarized. The system may be configured so that the light is s-polarized, which may be most suitable for conventional windscreens, or the system may be configured so that the light is p-polarized, which may be most suitable for windscreens that are configured for high reflectivity to p-polarized light.

While the system of FIG. 10 has the holographic picture generating unit located substantially below the waveguide 1000, so that the spatially modulated light enters the waveguide 1003 via its lower surface 1005, the present disclosure is not limited to such an arrangement. It is possible for the respective components of the system to be arranged in any suitable manner.

For example, the holographic picture generating unit may be located substantially above the waveguide 1000, and/or the light from the holographic picture generating unit may be otherwise directed by mirrors or other suitable optical components such that the spatially modulated light enters the waveguide from another direction, such as via its upper surface 1002. If the spatially modulated light entered the waveguide 1000 via its upper surface 1002, it would encounter a reflection from the highly reflective lower surface 1005 before being propagated back towards the upper surface 1002. Therefore, in arrangements that include a quarter wave plate or other means for circularly polarizing the spatially modulated light before it enters the waveguide 1000, the spatially modulated light would have the handedness (i.e., the direction) of its circular polarization reversed once before it approaches the upper surface 1002 from below and, thus, before it had an opportunity to be transmitted out of the waveguide 1000, via the upper surface 1005. Therefore, in order to ensure that any of the spatially modulated light that is transmitted by the upper surface 1002 is not immediately blocked by the circular polarizer 1500, the handedness of the incoming spatially modulated light that first enters the waveguide 1000 from above should be opposite to the handedness that the circular polarizer 1500 transmits. Therefore, for the circular polarizer 1500 described above in relation to the example system of FIG. 10, the spatially modulated light that enters the waveguide from above should be right-handed circularly polarized, which would be reversed to being left handed circularly polarized on reflection from the lower surface 1005, which would enable it to be transmitted by the circular polarizer 1500. As with the arrangement shown in FIG. 10, any light not transmitted by the upper surface 1002 would encounter cycles of two reflections (one from the upper surface 1002, then one from the lower surface 1005) that would ensure that the handedness of its circular polarization was suitable for transmission through the circular polarizer 1500, every time it reaches the upper surface 1002 from below.

Other variations may be made to the system, whilst still providing the advantages described above in relation to the example arrangement shown in FIG. 10. For example, in some arrangements the circular polarizer may be provided in conjunction with (e.g., covering) just part of the upper surface of the waveguide. For example, if sunlight was expected to enter the waveguide at a first end and light from the picture generating unit was expected to enter the waveguide at a second end, opposite the first end, the circular polarizer may be provided only at or near the first end of the waveguide and it may be omitted at or near the second end, so that the light from the picture generating unit may not have to be circularly polarized in order to be transmitted out of the waveguide, to reach the user. A selection may be made as to how much of the upper surface of the waveguide should be provided in conjunction with the circular polarizer, based on the particular details of each system arrangement such as the size of the waveguide, the expected angles of incidence of the sunlight and/or the light from the picture generating unit and the number of reflections expected within the waveguide of the light from the picture generating unit before its transmission becomes insignificant or falls below a threshold level.

It should be noted that terms such as 'left', 'right', 'upper' and 'lower', used in relation to FIG. 10 or any of the other figures herein, are not to be regarded as limiting. Instead, they are used for illustrative purposes, to aid better understanding of the particular examples shown in the figures.

Although the waveguide in FIG. 10 is shown as comprising two reflective surfaces, the improvements described herein are equally applicable to a slab configuration waveguide, in which light is guided inside by the slab by internal reflections between the top and bottom coated surfaces of the slab. Although embodiments are described above as being configured for two cycles of reflection (or, "bounces") of light within the waveguide, other numbers of reflection cycles are also contemplated.

The picture generating unit need not be a holographic picture generating unit. It may comprise any suitable picture generating unit, or image projection system, that is configured to project a picture or image towards a user via a waveguide that act as a viewing window expander. The picture generating unit may be configured to project a plurality of pictures or images towards the user on a dynamic basis. The picture generating unit may be configured to operate substantially continuously or on an intermittent basis.

Although sunlight has been specifically mentioned above as posing a risk of glare to the viewer, it will be appreciated that other types of light may also pose a glare risk. The arrangements described herein may be configured to address those other potential glare risks in a similar manner, using circular polarization and reflections within a waveguide to block some or all of the unwanted light from reaching the viewer without interrupting the projection of a desired image or picture to the viewer.

Although a HUD system in a vehicle has been specifically described herein, the present disclosure is not limited to vehicles or to HUD systems. The light from the picture generating unit may not be reflected from a windscreen but may propagate towards the viewer directly and/or may be reflected by a window, mirror, or any other suitable component.

Thus, an effective and reliable system and method are provided herein for reducing and potentially eliminating glare and its potentially dangerous side effects from a system that includes a picture generator and a waveguide. This is done in a simple and compact manner, by providing a circular polarizer in conjunction with at least part of the waveguide and harnessing the fact that each reflection that light will encounter within the waveguide will change the direction (or, 'handedness') of its circular polarization relative to its propagation direction. The present inventors have recognised that the effect of the reflections within a waveguide on circular polarization can be used advantageously in order to block unwanted light. Moreover, they have recognised that light from a picture generating unit can have a circular polarization applied thereto, in order to ensure that it is not blocked by the circular polarizer, and that doing so will have little or no detrimental effect on the image quality or optical power or perceived brightness or accuracy of the image that reaches the viewer from the picture generating unit.

The improvements disclosed herein can be provided in a compact and low-cost manner. They make use of a waveguide that is already present in a system for pupil expansion of picture-related light, and use it in conjunction with a circular polarizer to also provide significant glare reduction that would otherwise be caused by other, ambient light. The present improvements do not require the use of bulky or complicated components, nor do they place any processing burden on the picture generating unit or on any system, device, or vehicle within which it is comprised. Moreover, the improvements can be implemented without the need to change the relative positions of a picture generating unit and its viewing window expander. This is significant in arrangements for which space is limited, and competed for by many different subsystems, for example for HUD systems in a vehicle. The improvements disclosed herein may be added to a pre-existing system or implemented as part of a new system.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, a detector is provided such as a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European Patent No. 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A display system having a viewing window via which a viewer can receive light of a picture, wherein the display system comprises:
    a picture-generating unit arranged to display a hologram of a picture and to provide spatially-modulated linear-polarized light formed from the hologram, the picture-generating unit comprising a λ/4 retarder arranged to convert the spatially-modulated linearly-polarized light to provide spatially-modulated circularly-polarized light having a first handedness;
    a first surface that is transmissive-reflective and a second surface that is reflective, the picture-generating unit being arranged to direct the spatially-modulated circularly-polarized light towards the first and second surfaces such that the spatially-modulated light is partially transmitted by the first surface to form a substantially continuous viewing window, such that the spatially-modulated circularly-polarized light that is transmitted by the first surface undergoes zero or an even number of reflections between the first and second surfaces;

a circular polarizer arranged to circularly polarize ambient light incident upon the first surface from a first side thereof with the first handedness;

wherein the first and second surfaces and circular polarizer are arranged such that circularly-polarized ambient light that is reflected by the second surface is incident on a second side of the circular polarizer and is blocked by the circular polarizer, wherein the display system is arranged such that the spatially-modulated circularly-polarized light is circularly-polarized with the first handedness such that it is transmitted by the circular polarizer after partial transmission through the first surface from the second side to the first side thereof.

2. The display system as claimed in claim 1, wherein the spatially-modulated linear-polarized light is encoded with the hologram.

3. The display system as claimed in claim 2 wherein the hologram is a Fourier or Fresnel hologram.

4. The display system as claimed in claim 1, wherein the spatially-modulated linear-polarized light is encoded with a holographic reconstruction of the picture.

5. The display system as claimed in claim 4, wherein the holographic reconstruction of the picture is formed on a light receiving surface.

6. The display system as claimed in claim 1, wherein the circular polarizer comprises a linear polarizer and a λ/4 retarder.

7. The display system as claimed in claim 1, wherein the first and second surfaces are discrete surfaces.

8. The display system as claimed in claim 1, wherein the picture generating picture-generating unit further comprises:
    a light source arranged to illuminate the hologram with linearly-polarized light.

9. A method of holographic projection of light of a picture, the method comprising:
    receiving the picture for projection;
    displaying a hologram representing the picture;
    providing circularly-polarized light that is spatially-modulated in accordance with the hologram, the provision of the spatially-modulated circularly-polarized light comprising illuminating the hologram with light from a light source, the spatially-modulated circularly-polarized light having a first handedness;
    directing the spatially-modulated circularly-polarized light towards a first surface that is transmissive-reflective and a second surface that is reflective;
    partially transmitting the spatially-modulated circularly-polarized light at the first surface to form a substantially continuous viewing window, such that the spatially-modulated circularly-polarized light that is transmitted at the first surface undergoes zero or an even number of reflections between the first surface and the second surface; and
    passing the spatially-modulated light through a circular polarizer to provide light of the picture to the viewer,
    wherein the circular polarizer is arranged to circularly polarize with the first handedness ambient light incident upon the first surface from a first side thereof, and
    wherein circularly-polarized ambient light that is reflected by the second surface is incident on a second side of the circular polarizer and blocked by the circular polarizer,
    wherein the spatially-modulated circularly-polarized light is circularly-polarized with the first handedness such that it is transmitted by the circular polarizer after partial transmission through the first surface from a second side to a first side thereof.

10. The method of claim 9, wherein said method is a computer-implemented method.

11. A display system having a viewing window via which a viewer can receive light of a picture, wherein the display system comprises:
    a picture-generating unit arranged to display a hologram of a picture and to provide circularly-polarized light that is spatially-modulated in accordance with the hologram, the spatially-modulated circularly-polarized light having a first handedness;
    a first reflective surface and a second reflective surface, wherein at the least the first reflective surface is transmissive-reflective, the picture-generating unit being arranged to direct the spatially-modulated circularly-polarized light towards the first and second reflective surfaces such that the spatially-modulated circularly-polarized light is partially transmitted by the first reflective surface, such that the spatially-modulated circularly-polarized light that is transmitted at the first surface undergoes zero or an even number of reflections between the first surface and the second surface;
    a circular polarizer arranged such that ambient light received through the first reflective surface from a first side thereof is circularly-polarized with the first handedness;
    wherein the second reflective surface is arranged to reflect at least a portion of the circularly-polarized ambient light and the circular polarizer is arranged to block the reflected circularly-polarized ambient light,
    wherein the display system is arranged such that the spatially-modulated circularly-polarized light is circularly-polarized with the first handedness such that it is transmitted by the circular polarizer after partial transmission through the first reflective surface from a second side to a first side thereof.

* * * * *